US012313994B2

(12) United States Patent
Kobayashi et al.

(10) Patent No.: US 12,313,994 B2
(45) Date of Patent: May 27, 2025

(54) IMAGE FORMING APPARATUS

(71) Applicant: CANON KABUSHIKI KAISHA, Tokyo (JP)

(72) Inventors: Shinsuke Kobayashi, Kanagawa (JP); Ai Suzuki, Tokyo (JP); Kensuke Umeda, Kanagawa (JP); Kazuhiro Funatani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/446,295

(22) Filed: Aug. 8, 2023

(65) Prior Publication Data

US 2023/0384722 A1 Nov. 30, 2023

Related U.S. Application Data

(63) Continuation of application No. 17/846,989, filed on Jun. 22, 2022, now Pat. No. 11,768,456.

(30) Foreign Application Priority Data

Jun. 25, 2021 (JP) ................................ 2021-106015
Dec. 17, 2021 (JP) ................................ 2021-205146

(51) Int. Cl.
*G03G 15/16* (2006.01)
*G03G 15/00* (2006.01)
*G03G 15/02* (2006.01)
*G03G 15/06* (2006.01)

(52) U.S. Cl.
CPC ..... *G03G 15/5008* (2013.01); *G03G 15/0225* (2013.01); *G03G 15/0233* (2013.01); *G03G 15/065* (2013.01); *G03G 15/1675* (2013.01); *G03G 15/5045* (2013.01)

(58) Field of Classification Search
CPC .......... G03G 15/0225; G03G 15/0233; G03G 15/5008
USPC .................................. 399/66, 107, 110, 123
See application file for complete search history.

(56) References Cited

U.S. PATENT DOCUMENTS 7,639,960 B2 * 12/2009 Kobashi ............ G03G 15/0216 399/175
8,774,695 B2 * 7/2014 Ishizuka ............ G03G 21/0035 399/346
9,891,567 B2 * 2/2018 Fukuda .................. G03G 15/50
2010/0247123 A1 9/2010 Honjoh

FOREIGN PATENT DOCUMENTS

JP 2003057925 A 2/2003
JP 2005234035 A 9/2005
JP 2007101968 A 4/2007
JP 2007139869 A 6/2007
JP 2007316134 A 12/2007
JP 2010145852 A 7/2010
JP 2010224395 A 10/2010

* cited by examiner

*Primary Examiner* — Hoan H Tran
(74) *Attorney, Agent, or Firm* — Canon U.S.A., Inc., IP Division

(57) ABSTRACT

An image forming apparatus controls the number of rotations of a photosensitive drum based on information related to the use of the photosensitive drum and a suspension time in a rotation operation of rotating the photosensitive drum after a lapse of the suspension time between a first image forming operation of forming an image on a transfer material and a second image forming operation performed after the first image forming operation.

20 Claims, 13 Drawing Sheets

FIG.6

| | NUMBER OF SHEETS FED IN PREVIOUS JOB (SHEETS) | | | | | | | |
|---|---|---|---|---|---|---|---|---|
| SUSPENSION TIME (SEC) | 1 | 3 | 5 | 10 | 20 | 50 | 100 | 200 |
| 5 | 0 | 0 | 0 | 5 | 5 | 10 | 10 | 10 |
| 10 | 0 | 10 | 10 | 10 | 15 | 15 | 25 | 25 |
| 20 | 0 | 10 | 10 | 15 | 20 | 25 | 30 | 30 |
| 30 | 10 | 15 | 15 | 15 | 25 | 35 | 40 | 40 |
| 40 | 0 | 10 | 15 | 15 | 20 | 25 | 30 | 30 |
| 50 | 0 | 0 | 10 | 10 | 15 | 15 | 20 | 20 |
| 60 | 0 | 0 | 0 | 10 | 10 | 15 | 20 | 20 |
| 70 | 0 | 0 | 0 | 0 | 5 | 10 | 15 | 15 |
| 90 | 0 | 0 | 0 | 0 | 5 | 10 | 15 | 15 |

FIG.7

○ NONE: NO IMAGE DEFECT
△ SLIGHT: SLIGHT TONER ADHESION BUT NO IMAGE DEFECT
× SIGNIFICANT: SIGNIFICANT IMAGE DEFECT

COMPARATIVE EXAMPLE

| | NUMBER OF SHEETS FED IN PREVIOUS JOB (SHEETS) | | | | | | | |
|---|---|---|---|---|---|---|---|---|
| SUSPENSION TIME (SEC) | 1 | 3 | 5 | 10 | 20 | 50 | 100 | 200 |
| 5 | ○ | ○ | ○ | ○ | ○ | △ | △ | △ |
| 10 | ○ | △ | △ | △ | △ | △ | × | × |
| 20 | ○ | △ | △ | △ | △ | × | × | × |
| 30 | △ | △ | △ | △ | × | × | × | × |
| 40 | ○ | △ | △ | △ | △ | × | × | × |
| 50 | ○ | ○ | △ | △ | △ | △ | × | × |
| 60 | ○ | ○ | ○ | △ | △ | △ | △ | △ |
| 70 | ○ | ○ | ○ | ○ | ○ | △ | △ | △ |
| 90 | ○ | ○ | ○ | ○ | ○ | △ | △ | △ |

FIRST EXEMPLARY EMBODIMENT

| | NUMBER OF SHEETS FED IN PREVIOUS JOB (SHEETS) | | | | | | | |
|---|---|---|---|---|---|---|---|---|
| SUSPENSION TIME (SEC) | 1 | 3 | 5 | 10 | 20 | 50 | 100 | 200 |
| 5 | ○ | ○ | ○ | ○ | ○ | ○ | ○ | ○ |
| 10 | ○ | ○ | ○ | ○ | ○ | ○ | ○ | ○ |
| 20 | ○ | ○ | ○ | ○ | ○ | ○ | △ | △ |
| 30 | ○ | ○ | ○ | ○ | ○ | △ | △ | △ |
| 40 | ○ | ○ | ○ | ○ | ○ | ○ | △ | △ |
| 50 | ○ | ○ | ○ | ○ | ○ | ○ | ○ | ○ |
| 60 | ○ | ○ | ○ | ○ | ○ | ○ | ○ | ○ |
| 70 | ○ | ○ | ○ | ○ | ○ | ○ | ○ | ○ |
| 90 | ○ | ○ | ○ | ○ | ○ | ○ | ○ | ○ |

FIG.10

| | NUMBER OF SHEETS FED IN PREVIOUS JOB (SHEETS) | | | | | | | |
|---|---|---|---|---|---|---|---|---|
| SUSPENSION TIME (SEC) | 1 | 3 | 5 | 10 | 20 | 50 | 100 | 200 |
| 5 | 0 | 0 | 0 | 0 | 0 | 5 | 5 | 5 |
| 10 | 0 | 5 | 5 | 5 | 10 | 10 | 20 | 20 |
| 20 | 0 | 5 | 5 | 10 | 15 | 20 | 25 | 25 |
| 30 | 5 | 10 | 10 | 10 | 20 | 30 | 30 | 30 |
| 40 | 0 | 5 | 10 | 10 | 10 | 15 | 25 | 25 |
| 50 | 0 | 0 | 5 | 5 | 10 | 10 | 15 | 15 |
| 60 | 0 | 0 | 0 | 5 | 5 | 5 | 10 | 10 |
| 70 | 0 | 0 | 0 | 0 | 0 | 5 | 10 | 10 |
| 90 | 0 | 0 | 0 | 0 | 0 | 5 | 10 | 10 |

IMAGE FORMING APPARATUS

CROSS-REFERENCE TO RELATED APPLICATIONS

The present application is a continuation of U.S. patent application Ser. No. 17/846,989, filed on Jun. 22, 2022, which claims priority from Japanese Patent Application No. 2021-106015 filed Jun. 25, 2021 and Japanese Patent Application No. 2021-205146 filed Dec. 17, 2021, which are hereby incorporated by reference herein in their entireties.

BACKGROUND

Field

The present disclosure relates to an image forming apparatus such as a laser printer, a copy machine, and a facsimile that uses an electrophotographic recording method.

Description of the Related Art

An electrophotographic image forming apparatus uniformly charges a photosensitive drum serving as an image bearing member and thereafter exposes the photosensitive drum based on an image pattern so that an electrostatic latent image is formed on the photosensitive drum. The electrostatic latent image on the photosensitive drum is then developed with toner and visualized, and the resulting image is transferred onto a recording material such as a sheet. Then, the untransferred residual toner on the photosensitive drum is removed from the photosensitive drum and collected. While various cleaning methods for removing untransferred residual toner are known, methods that use brushes are widely known as an effective method.

Japanese Patent Application Laid-Open No. 2007-65580 discusses a structure with a brush for cleaning toner on a photosensitive drum, and the brush is situated upstream of a charging unit and downstream of a transfer unit in a movement direction of the photosensitive drum. According to this document, in a case where, for example, image forming is interrupted due to paper jams, the brush is charged to a predetermined polarity to prevent untransferred toner on the photosensitive drum from depositing on the brush and to maintain cleaning performance.

The technique discussed in Japanese Patent Application Laid-Open No. 2007-65580, however, has the following issue. Specifically, in a case where a recording material is fed through an image forming apparatus with the brush disclosed in Japanese Patent Application Laid-Open No. 2007-65580, moisture in the image forming apparatus adheres to the brush. With a lapse of a suspension time, the moisture accumulated on the brush is aggregated on a surface of the photosensitive drum to form masses of water droplets. In a case where a next image forming operation is performed in this state, the masses of water droplets on the brush move onto the photosensitive drum. This changes the state of the surface of the photosensitive drum and in some cases causes image defects. For example, masses of water droplets on the photosensitive drum attract toner at a development abutment portion that is a contact portion between the photosensitive drum and a development member, and this sometimes causes toner smears.

SUMMARY

The present disclosure is directed to reducing image defects caused by toner smears originating from water droplets on a brush.

An image forming apparatus includes a rotary photosensitive drum, a charging member configured to charge a surface of the photosensitive drum at a charging portion, a development unit configured to supply toner onto the surface of the photosensitive drum charged by the charging member and to form a toner image on the photosensitive drum, a transfer member configured to be in contact with the photosensitive drum to form a transfer portion and transfer the toner image formed on the photosensitive drum to a transfer material at the transfer portion, a brush member in contact with the surface of the photosensitive drum at a position downstream of the transfer portion and upstream of the charging portion in a rotation direction of the photosensitive drum, a driving unit configured to rotate the photosensitive drum, a storage unit configured to store information related to the use of the photosensitive drum, and a control unit configured to control the driving unit, wherein the control unit controls a rotation operation of rotating the photosensitive drum so that the rotation operation is performed after a suspension time between a first image forming operation of forming an image on the transfer material and a second image forming operation performed after the first image forming operation passes and before the second image forming operation is performed, and wherein the control unit controls a number of rotations of the photosensitive drum in the rotation operation based on the information and the suspension time.

Further features of the present disclosure will become apparent from the following description of exemplary embodiments with reference to the attached drawings.

BRIEF DESCRIPTION OF THE DRAWINGS

FIG. 6 illustrates a table of extension times of a pre-rotation process according to the first exemplary embodiment.

FIG. 7 illustrates tables of toner smear results according to the first exemplary embodiment.

FIG. 10 illustrates a table of extension times of a pre-rotation process according to a second exemplary embodiment.

DESCRIPTION OF THE EMBODIMENTS

Various exemplary embodiments of the present disclosure will be described in detail below with reference to the drawings based on examples. It is to be noted that dimensions, materials, shapes, and relative positions of components described in the exemplary embodiments are to be changed as appropriate for a structure of an apparatus to which the disclosure is applied and for various conditions. In other words, the scope is not limited to the exemplary embodiments described below.

1. Image Forming Apparatus

Figure 1:
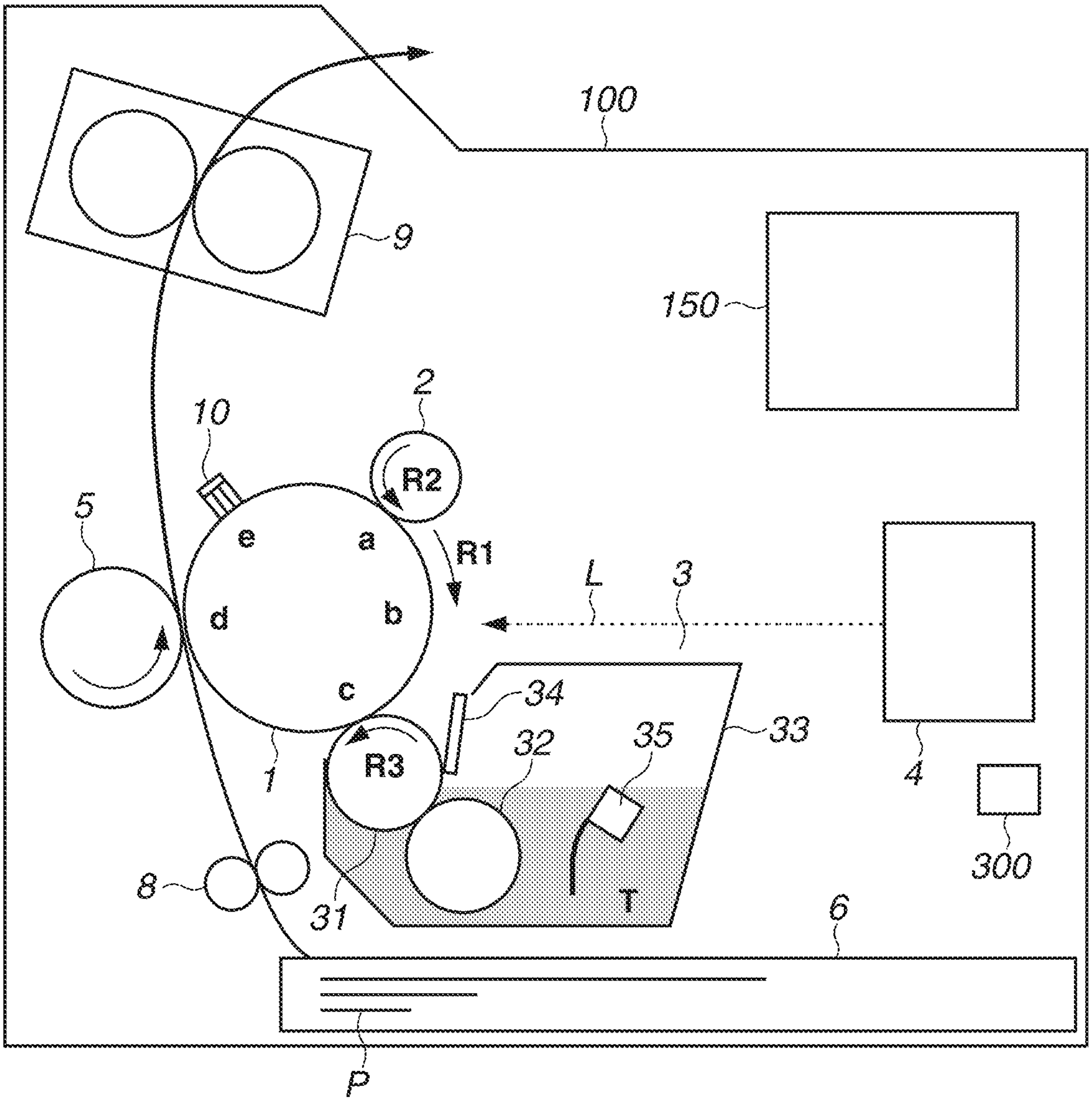
FIG. 1 is a drawing illustrating an image forming apparatus according to a first exemplary embodiment.

FIG. 1 is a schematic view illustrating a structure of an image forming apparatus 100 according to a first exemplary embodiment.

Figure 3:
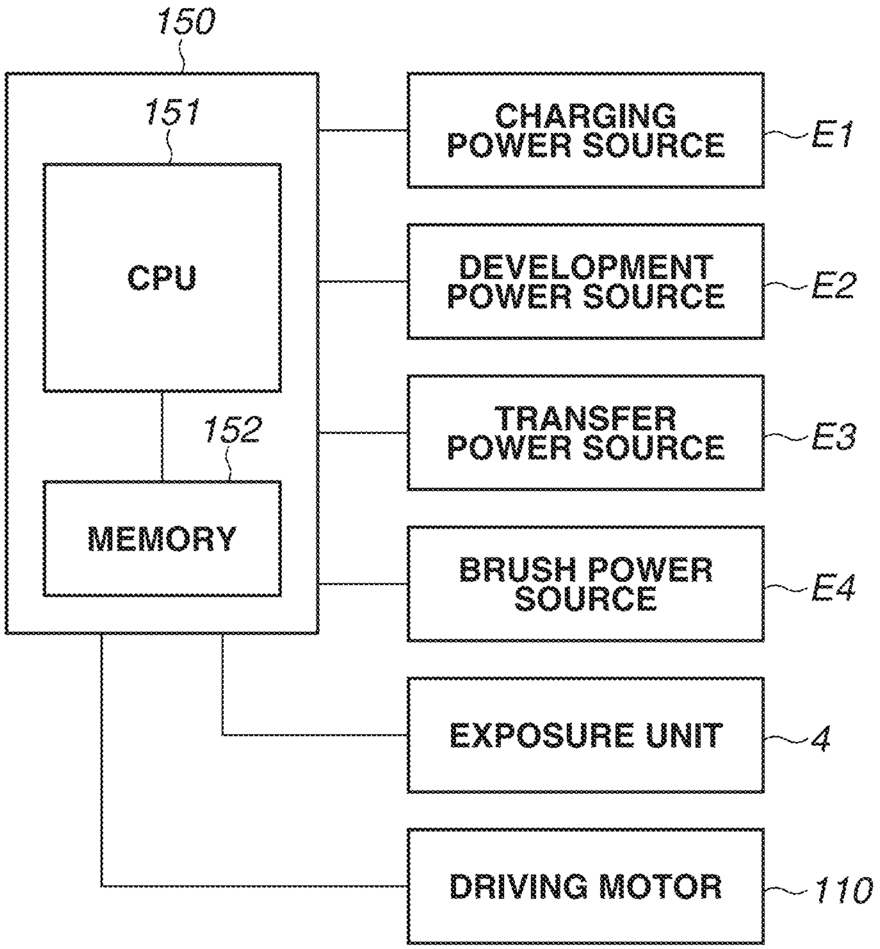
FIG. 3 is a control block diagram according to the first exemplary embodiment.

The image forming apparatus 100 according to the present exemplary embodiment is a monochrome laser beam printer that uses a cleaner-less method and a contact charging method. The image forming apparatus 100 includes a photosensitive drum 1. The photosensitive drum 1 is a drum-shaped (cylindrical) electrophotographic photosensitive member serving as a rotatable image bearing member. When an image output operation is started, the photosensitive drum 1 is driven and rotated in a direction of an arrow R1 in FIG. 1 by a driving motor (driving unit) serving as a driving unit 110 (FIG. 3). The photosensitive drum 1 has an outer diameter of 24 mm, and a circumferential speed (surface speed) of the photosensitive drum 1 is 140 mm/sec.

A surface of the photosensitive drum 1 being rotated is uniformly charged to a predetermined potential of normal polarity (that is negative polarity according to the present exemplary embodiment) by a charging roller 2 near a charging portion a where the photosensitive drum 1 and the charging roller 2 come into contact with each other. The charging roller 2 is a roller-type charging member as a charging unit. More specifically, the charging roller 2 charges the surface of the photosensitive drum 1 by a discharge that occurs in at least one of minute spaces between the charging roller 2 and the photosensitive drum 1 that are formed upstream and downstream of a contact portion in contact with the photosensitive drum 1 in a rotation direction of the photosensitive drum 1. In the present exemplary embodiment, an abutment portion of the charging roller 2 and the photosensitive drum 1 in the rotation direction of the photosensitive drum 1 will be described as the charging portion a.

The charging roller 2 is an elastic roller that includes a conductive elastic layer around a core metal. The charging roller 2 is disposed in contact with the photosensitive drum 1 and is driven and rotated in a direction of an arrow R2 in FIG. 1 by a driving motor (not illustrated).

While the charging roller 2 is driven and rotated according to the present exemplary embodiment, the charging roller 2 can be rotated by rotation of the photosensitive drum 1. A charging power source E1 (FIG. 3) serving as a charging voltage application unit applies a predetermined charging voltage to the charging roller 2. The predetermined charging voltage is a direct-current voltage of negative polarity. According to the present exemplary embodiment, the direct-current voltage of negative polarity as the charging voltage is applied to the charging roller 2 during the charging process. An example of the charging voltage according to the present exemplary embodiment is −1200 V. Thus, according to the present exemplary embodiment, the surface of the photosensitive drum 1 is uniformly charged to a dark-area potential Vd of −600 V.

The charged surface of the photosensitive drum 1 is scanned and exposed with a laser beam L modulated based on image data by an exposure device (laser exposure unit) 4 as an exposure unit (electrostatic image forming unit). The exposure device 4 forms an electrostatic latent image on the photosensitive drum 1 by repeating the exposure of the photosensitive drum 1 with the laser beam L in a main-scan direction (rotation axis direction) while performing the exposure in a sub-scan direction (surface movement direction) as well. According to the present exemplary embodiment, the absolute value of the dark-area potential Vd of the surface of the photosensitive drum 1 that is formed as a result of uniform charging is decreased to a light-area potential V1 of −100 V as a result of the exposure by the exposure device 4. A position on the photosensitive drum 1 that is exposed by the exposure device 4 in the rotation direction of the photosensitive drum 1 is an image exposure portion b. The exposure device 4 is not limited to a laser scanner device. For example, a light emitting diode (LED) array with a plurality of LEDs arranged along a lengthwise direction of the photosensitive drum 1 can be used.

The electrostatic latent image formed on the photosensitive drum 1 is developed (visualized) as a toner image by a development device 3 serving as a development unit using a toner as a developer agent. The toner as a developer agent according to the present exemplary embodiment is a spherical non-magnetic toner having a mean particle size of 6.4 μm and a mean circularity of 0.98. The non-magnetic toner for use in the present exemplary embodiment desirably has a high mean circularity, specifically 0.96 or higher. The mean circularity according to the present exemplary embodiment is used as a simple method for quantitatively representing a particle shape. A particle shape is measured using a flow type particle image analyzer FPIA-2100 manufactured by TOA Medical Electronics Co., Ltd., and a circularity is calculated using formula (1) below.

$$\text{Circularity } (Ci) = \frac{\text{Perimeter of Circle Having Same Projection Area as Number of Particles}}{\text{Perimeter of Projection Particle Image}}. \qquad \text{Formula (1)}$$

Further, as expressed by formula (2) below, the mean circularity is defined as a value obtained by dividing the sum of measured circularities of all particles by the total number of particles.

$$\text{Mean circularity } \overline{(C)} = \sum_{i=m}^{m} Ci/m \qquad \text{Formula (2)}$$

The development device 3 includes a development roller 31 serving as a developer agent bearing member, a toner supply roller 32 serving as a developer agent supply unit, a developer agent storage chamber 33 storing toner, and a development blade 34. The toner stored in the developer agent storage chamber 33 is agitated by an agitation member 35 and supplied to a surface of the development roller 31 by the toner supply roller 32. The toner supplied to the surface of the development roller 31 is conveyed through a contact portion of the development roller 31 and the development blade 34. As a result, the toner is shaped into a uniform thin layer and charged to negative polarity by frictional charging. While a single-component non-magnetic contact development method is used in the present exemplary embodiment, the method is not limited thereto, and a two-component non-magnetic contact method or a non-contact development method can be also used. Further, a magnetic development method can be used. Further, while a normal polarity of the toner is negative polarity according to the present exemplary embodiment, the normal polarity is not limited to negative polarity. The normal polarity can be positive polarity and in this case, a voltage relationship described below is reversed to an opposite polarity as appropriate. The development roller 31 is rotated and driven counterclockwise in a direction of the arrow R3 in FIG. 1 by the driving motor 110 so that the surface of the photosensitive drum 1 and the surface of the development roller 31 move in the same direction at a development portion c where the photosensitive drum 1 and the development roller 31 are in contact with each other. The driving motor as the driving unit 110 that drives the development roller 31 can be the same main motor as the driving unit 110 of the photosensitive drum 1, or respective different driving motors can rotate the photosensitive drum 1 and the development roller 31. During development, a development power source E2 (FIG. 3) serving as a development voltage application unit applies a predetermined development voltage (development bias) to the development roller 31. According to the present exemplary embodiment, a direct-current voltage of negative polarity is applied as the development voltage to the development roller 31 during development, and the development voltage is set to −300 V. According to the present exemplary embodiment, the toner charged to the same polarity (negative polarity according to the present exemplary embodiment) as a charging polarity of the photosensitive drum 1 adheres to an exposed surface (image portion) that is an image forming portion on the photosensitive drum 1 and has a decreased absolute value of potential as a result of being exposed after being uniformly charged. This development method is referred to as a reversal development method.

Further, while the development roller 31 is constantly in contact with the photosensitive drum 1 at the development portion c according to the present exemplary embodiment, the development roller 31 and the photosensitive drum 1 can be in an abutment state and a separation state. In this case, a development abutment separation mechanism can be provided separately. During a rotation operation that is a pre-rotation process described below, the photosensitive drum 1 can be rotated with the development roller 31 being separated from the photosensitive drum 1.

A toner image formed on the photosensitive drum 1 is conveyed to a transfer portion d. The transfer portion d is a contact portion of the photosensitive drum 1 and a transfer roller 5 serving as a transfer unit. The transfer roller 5 is a roller-type transfer member. The transfer roller 5 according to the present exemplary embodiment uses a roller that includes a conductive nitrile butadiene rubber (NBR) hydrin-based sponge rubber and has an outer diameter of 12 mm and a hardness of 30° (Asker-C, 500 gf load). The transfer roller 5 according to the present exemplary embodiment is pressed against the photosensitive drum 1 at a predetermined pressure. Meanwhile, a recording material P that is a transfer material to which a toner image is to be transferred to is conveyed from a storage section 6 to the transfer portion d by a conveyor roller 8 in synchronization with the toner image on the photosensitive drum 1. Then, the toner image on the photosensitive drum 1 is transferred onto the recording material P picked and conveyed by the photosensitive drum 1 and the transfer roller 5, at the transfer portion d by the action of the transfer roller 5. At this time, a transfer power source E3 (FIG. 3) applies a predetermined transfer voltage to the transfer roller 5. The predetermined transfer voltage is a direct-current voltage of an opposite polarity (positive polarity according to the present exemplary embodiment) to the normal polarity of the toner. As a result, an electric field is formed between the transfer roller 5 and the photosensitive drum 1, and the toner image is electrostatically transferred from the photosensitive drum 1 to the recording material P. According to the present exemplary embodiment, the transfer voltage during transfer is, for example, +1000 V. The toner image is electrostatically transferred from the photosensitive drum 1 to the recording material P by the action of the electric field formed between the transfer roller 5 and the photosensitive drum 1.

The recording material P with the transferred toner image is conveyed to a fixing device 9 serving as a fixing unit. The fixing device 9 applies heat and pressure to the recording material P, so that the toner image is fixed to the recording material P.

Meanwhile, untransferred residual toner that is not transferred to the recording material P and remains on the photosensitive drum 1 is conveyed to a brush member 10 located downstream of the transfer roller 5 in the rotation direction of the photosensitive drum 1. The brush member 10 that is used in the present exemplary embodiment will be described below.

2. Configuration of Brush Member

Next, a paper dust removal mechanism according to the present exemplary embodiment will be described below. As illustrated in FIG. 1, the image forming apparatus 100 according to the present exemplary embodiment includes the brush member 10 (collection member). The brush member 10 is a contact member as the paper dust removal mechanism. According to the present exemplary embodiment, the image forming apparatus 100 includes the brush member 10, and the brush member 10 is brought into contact with the surface of the photosensitive drum 1 and forms a brush contact portion (brush contact position) downstream of the transfer portion d and upstream of the charging portion a in the rotation direction of the photosensitive drum 1. According to the present exemplary embodiment, a contact portion of the brush member 10 and the photosensitive drum 1 in the rotation direction of the photosensitive drum 1 will be described as the brush contact portion.

Figure 2A:
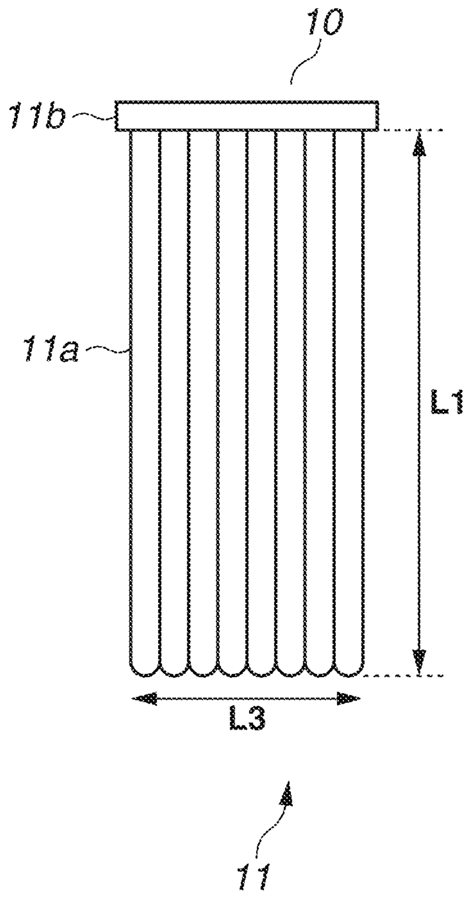
FIGS. 2A and 2B are schematic views illustrating a brush member according to the first exemplary embodiment.
Figure 2B:
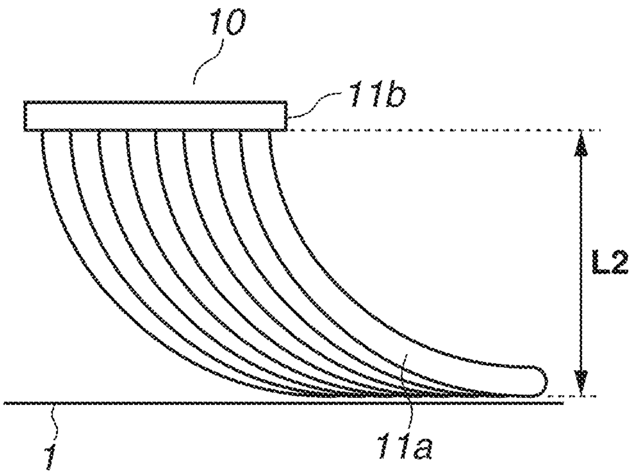

FIG. 2A is a schematic view illustrating the brush member 10 alone along the lengthwise direction thereof (substantially parallel to a rotation axis line direction of the photosensitive drum 1). Further, FIG. 2B is a schematic view illustrating the brush member 10 along the lengthwise direction thereof in a state where the brush member 10 is abutted against the photosensitive drum 1.

A fixed brush 11 constitutes a brush portion of the brush member 10. The fixed brush 11 is fixed and has conductivity. As illustrated in FIG. 2, the brush member 10 includes a pile yarn (also referred to as conductive yarn) 11*a* and a base cloth 11*b* supporting the pile yarn 11*a*. The pile yarn 11*a* consists of a plurality of conductive Nylon 6 hairs and scrabbles the surface of the photosensitive drum 1. As described above, the brush member 10 is disposed to come into contact with the photosensitive drum 1 downstream of the transfer portion d and upstream of the charging portion a in the movement direction (rotation direction) of the photosensitive drum 1.

The brush member 10 is disposed so that the lengthwise direction of the brush member 10 is substantially parallel to the rotation axis line direction of the photosensitive drum 1. According to the present exemplary embodiment, the fixed brush 11 includes the conductive yarn 11*a* consisting of nylon fibers containing conductive substances and the base cloth 11*b* made of synthesized fibers containing carbon as a conductive agent, and the conductive yarn 11*a* is woven in the base cloth 11*b*. Rayon, acryl, and polyester besides nylon can be used as a material of the conductive yarn 11*a*.

As illustrated in FIG. 2A, a distance L1 is from the base cloth 11*b* to a tail edge of the conductive yarn 11*a* exposed from the base cloth 11*b* in a state where the brush member 10 is alone, i.e., a state where no external force is applied to bend the conductive yarn 11*a*. According to the present exemplary embodiment, the distance L1 is 6.5 mm. The base cloth 11*b* is fixed to a support member (not illustrated) disposed at a predetermined position on the image forming apparatus 100 with a fixing material such as a double-sided tape, and the brush member 10 is disposed such that the tail edge of the conductive yarn 11*a* is pressed and warped against the photosensitive drum 1. According to the present exemplary embodiment, a clearance between the support member and the photosensitive drum 1 is fixed. A distance L2 is a minimum distance from the base cloth 11*b* of the brush member 10 that is fixed to the support member to the photosensitive drum 1. According to the present exemplary embodiment, the difference between the distances L2 and L1 is defined as amount of warpage of the brush member 10 against the photosensitive drum 1. According to the present exemplary embodiment, the amount of warpage of the brush member 10 against the photosensitive drum 1 is 1 mm. Further, according to the present exemplary embodiment, as illustrated in FIG. 2A, a length L3 of the brush member 10 in a circumferential direction (hereinafter, referred to as "widthwise direction") of the photosensitive drum 1 in a state where the brush member 10 is alone is 5 mm. Further, according to the present exemplary embodiment, the length of the brush member 10 in the lengthwise direction thereof is 216 mm. Thus, the brush member 10 comes into contact with an entire image forming region (region where a toner image may be formed) on the photosensitive drum 1 in the rotation axis line direction of the photosensitive drum 1. Further, according to the present exemplary embodiment, the conductive yarn 11*a* has a thickness of 2 denier and a density of 280 $kF/inch^2$ (kF/inch 2 is a unit of brush density and indicates the number of filaments per square inch). As described above, the brush member 10 is supported by the support member (not illustrated), is disposed at a fixed position with respect to the photosensitive drum 1, and scrubs the surface of the photosensitive drum 1 as the photosensitive drum 1 is moved.

The brush member 10 traps (collects) substances such as paper dust moved from the recording material P onto the photosensitive drum 1 at the transfer portion d to reduce the amount of paper dust that moves to the charging portion a and to the development portion c downstream of the brush member 10 in the movement direction of the photosensitive drum 1.

While the length L3 of the brush member 10 in the circumferential direction (hereinafter, "widthwise direction") of the photosensitive drum 1 according to the present exemplary embodiment is set to L3=5 mm, the length L3 is not limited to this value. The length L3 can be changed as appropriate for, for example, a lifetime of the image forming apparatus 100 or a process cartridge. Obviously the brush member 10 with a longer length in the widthwise direction can trap paper dust for a longer time.

While the length of the brush member 10 in the lengthwise direction according to the present exemplary embodiment is set to 216 mm, the length is not limited to this value. The length can be changed as appropriate for, for example, a maximum width of a sheet to be fed in the image forming apparatus 100.

While the brush member 10 according to the present exemplary embodiment has a fineness of 220T/96F (indicating a bundle of 96 yarns each having a thickness equal to 220 g per 10000 m), the fineness is desirably set considering a slip-through property of paper dust. The brush member 10 with a small fineness is less capable of blocking paper dust, and paper dust slips through easily. This may inhibit charging of the photosensitive drum 1 by the charging roller 2 and cause image defects. On the other hand, the brush member 10 with an excessively great fineness cannot collect toner and fine paper dust. This may result in non-uniform density due to uneven toner adhesion along the length of the charging roller 2 and image defects due to charging defects at portions with paper dust.

While the density of the brush member 10 according to the present exemplary embodiment is set to 280 kF/inch 2 (kF/inch 2 is a unit of brush density and indicates the number of filaments per square inch), the density is desirably set considering toner transmission property and paper dust trapping property. Specifically, the brush member 10 with an excessively high density causes toner to less transmit, and toner may become stuck. The toner that is stuck may spread and causes defects such as smears in the apparatus. Further, the brush member 10 with an excessively low density is less capable of trapping paper dust. Thus, the conductive yarn 11*a* desirably has a thickness of 1 denier to 6 denier and a density of 150 $kF/inch^2$ to 350 $kF/inch^2$ from the point of view of paper dust trapping property. The length of the brush member 10 in the widthwise direction is desirably 3 mm or more from the point of view of long lifetime. Further, a brush power source E4 (FIG. 3) serving as a brush voltage application unit is connected to the brush member 10.

3. Image Output Operation

The image forming apparatus 100 according to the present exemplary embodiment performs an image output operation (job) that is a series of operations for forming an image on a single recording material P or a plurality of recording materials P based on a single start instruction from an external device (not illustrated) such as a personal computer. The job generally includes an image forming process (printing process), the pre-rotation process, a sheet separation process in forming an image on a plurality of recording materials P, and a post-rotation process. The image forming process is a period of forming an electrostatic image on the photosensitive drum 1, developing an electrostatic image (forming a toner image), transferring a toner image, and fixing a toner image, and an image forming period refers to this period. More specifically, timings of the image forming period are different at positions of the electrostatic image forming, the toner image forming, the toner image transfer, and the toner image fixing. Thus, the image forming operation can be defined as the operations up to the toner image transfer or as the operations up to the toner image fixing. The above-described definition can be employed because the image forming operation performed on the photosensitive drum 1 is ended and a switch of the operation of the photosensitive drum 1 from the image forming operation to a non-image forming operation does not affect images that are already transferred to the recording materials P. The pre-rotation process is a period of performing a preparation operation before the image forming process. The sheet separation process is a period between recording materials P in continuously performing the image forming process (continuous image forming period) on the plurality of recording materials P. The post-rotation process is a period of performing an arrangement operation (preparation operation) after the image forming process. A non-image forming period refers to a period that excludes the image forming period and includes the pre-rotation process, the sheet separation process, the post-rotation process, and a preliminary rotation process. The preliminary rotation process is a preparation operation when the image forming apparatus 100 is turned on or recovers from a sleep state.

4. Control Configuration

FIG. 3 is a schematic block diagram illustrating a control configuration for controlling a main portion of the image forming apparatus 100 according to the present exemplary embodiment. The image forming apparatus 100 includes a control unit 150. The control unit 150 includes a central processing unit (CPU) 151, a memory (storage element) 152, and an input/output unit (not illustrated). The CPU 151 serving as a calculation control unit is a central element that performs calculation processing. The memory 152 is a storage unit such as a read-only memory (ROM) and a random access memory (RAM). The input/output unit controls signal transmission and reception to and from various components connected to the control unit 150. The RAM stores sensor detection results and calculation results, and the ROM stores control programs and data tables obtained in advance. According to the present exemplary embodiment, the memory 152 stores the number of rotations of the photosensitive drum 1 that is usage history information about the photosensitive drum 1. In other words, the memory 152 stores the number of rotations of the photosensitive drum 1 that is information related to the use of photosensitive drum 1. The usage history information about the photosensitive drum 1 is not limited to that described above and can be any information that changes as the photosensitive drum 1 is used, such as the rotation time of the photosensitive drum 1, the number of printed recording materials P, and layer thickness information about the photosensitive drum 1. The control unit 150 further includes a measurement unit 153. The measurement unit 153 measures a suspension time for determining a condition for performing the pre-rotation process described below.

The control unit 150 is a control unit that comprehensively controls operations of the image forming apparatus 100. The control unit 150 controls transmission and reception of various electric information signals and driving timings and performs a predetermined image forming sequence. The components of the image forming apparatus 100 are connected to the control unit 150. For example, in relation to the present exemplary embodiment, the charging power source E1, the development power source E2, the transfer power source E3, the brush power source E4, the driving motor 110, and an exposure unit 4 are connected to the control unit 150. Especially, in relation to the present exemplary embodiment, the control unit 150 controls turning on/off and output values of the various power sources E1, E2, E3, and E4 and performs an operation of extending the pre-rotation process described below. According to the present exemplary embodiment, a normal pre-rotation process time is set to 2 seconds. The pre-rotation process time is set as appropriate.

5. Operation of Extending the Pre-rotation Process

Figure 4A:
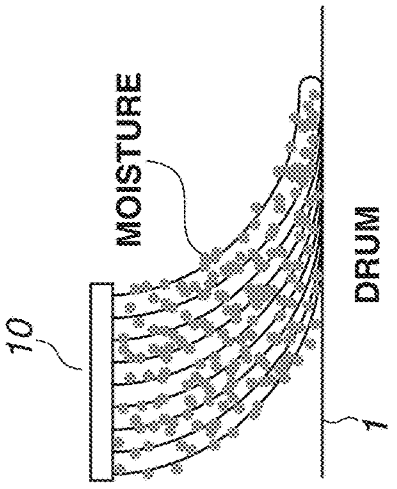
FIGS. 4A, 4B, and 4C are views illustrating moisture attached to a brush member according to the first exemplary embodiment.
Figure 4B:
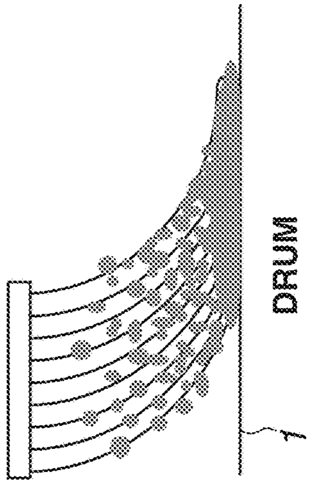
Figure 4C:
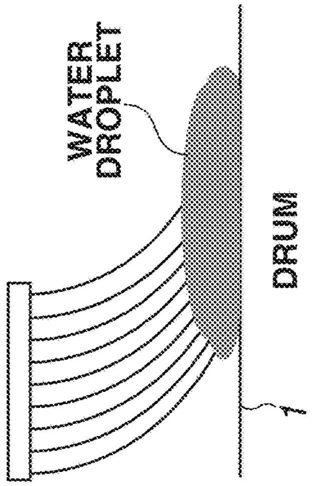

In a case where a job of consecutively feeding recording materials P is performed and then a normal pre-rotation process is performed at the time of performing a next job after a suspension for a predetermined time using the image forming apparatus 100, toner smears may occur. This is caused by moisture attached to the brush member 10 during the sheet feeding in the previous job. Specifically, moisture on the brush member 10 illustrated in FIG. 4A starts aggregating over time immediately after the suspension (FIG. 4B), and an aggregate of water droplets is eventually formed on the surface of the photosensitive drum 1 (FIG. 4C). The water droplets have different sizes depending on the environment where the image forming apparatus 100 is used and the number of sheets fed in the previous job. For example, in a high-temperature and high-humidity environment, the recording materials P have a high water content, so that the sizes of the water droplets increase as the number of sheets fed in the previous job increases. Further, after a predetermined time passes, the water droplets evaporate over time by atmospheric temperature in the image forming apparatus 100. Specifically, immediately after the suspension after the recording materials P are fed, the moisture aggregates over time and forms an aggregate of water droplets, and the water droplets evaporate and vanish over time after the predetermined time passes. In a case where the brush member 10 according to the present exemplary embodiment is used, the water droplets in maximum size are present on the surface of the photosensitive drum 1 thirty seconds after the driving of the photosensitive drum 1 is suspended. The suspension time varies depending on the length (L1), width, and density of the brush member 10 because a speed at which water droplets are formed, a speed at which water droplets evaporate, and sizes of formed water droplets vary depending on the length (L1), width, and density of the brush member 10.

Figure 5A:
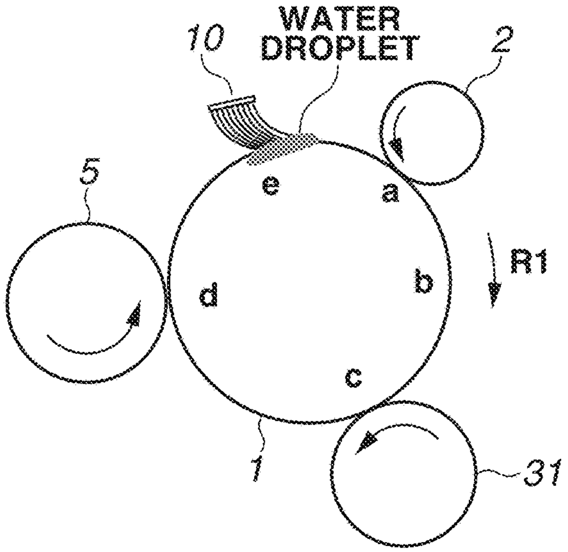
FIGS. 5A, 5B, and 5C are views illustrating a state of a portion around a photosensitive drum during an image output operation according to the first exemplary embodiment.
Figure 5B:
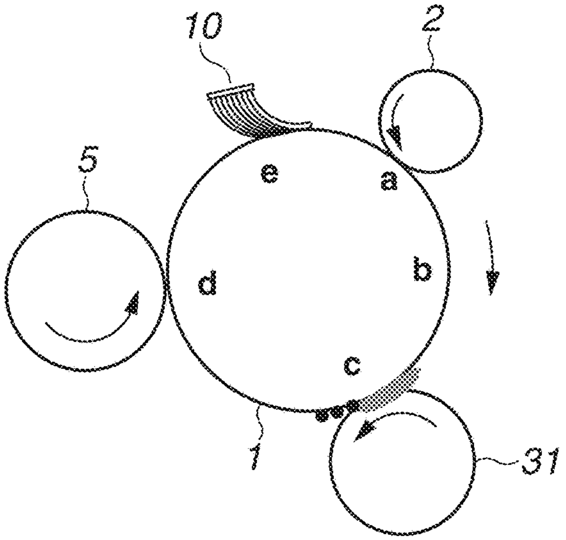
Figure 5C:
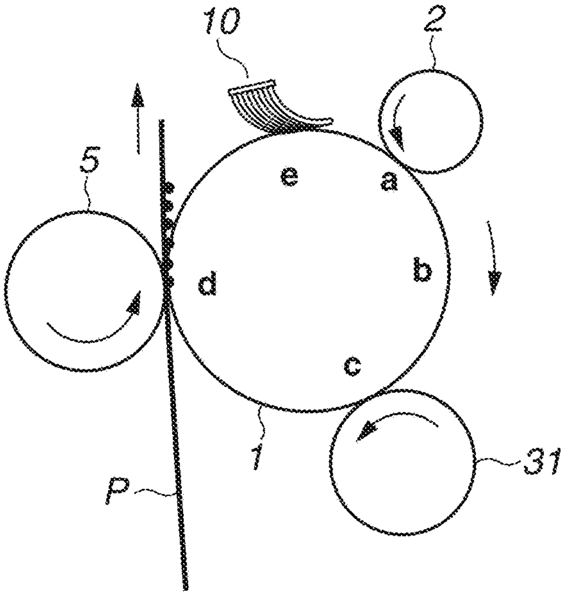

FIGS. 5A to 5C illustrate a state of a portion around the photosensitive drum 1 in a case where a next job is performed with an aggregate of water droplets on the surface of the photosensitive drum 1. When a job is started, the aggregate of water droplets illustrated in FIG. 5A is moved in the direction of the arrow R1 along with the rotation of the photosensitive drum 1, and at the charging portion a, part of the aggregate of water droplets adheres to the charging roller 2. Further, the water droplets having passed through the charging portion a attract the toner on the development roller 31 at the development portion c (FIG. 5B). With this phenomenon, image defects due to charging defects occur, and the toner attracted to the photosensitive drum 1 is transferred to the recording materials P conveyed to the transfer portion d and visualized as toner smears (FIG. 5C).

Thus, according to the present exemplary embodiment, the operation of extending the pre-rotation process is performed at the time of performing a next job after a suspension for the predetermined time after a job of consecutively feeding the recording materials P is performed. Specifically, the number of rotations of the photosensitive drum 1 in the pre-rotation process is controlled based on a suspension time between a first image forming operation of forming an image on a recording material P and a second image forming operation performed after the first image forming operation.

The condition for performing the operation of extending the pre-rotation process and extension times will be described below.

FIG. 6 illustrates extension times of the pre-rotation process according to the present exemplary embodiment. As illustrated in FIG. 6, according to the first exemplary embodiment, the condition for the pre-rotation process is determined based on the number of fed sheets in a previous job, and a longer extension time of the pre-rotation process is set for a greater number of fed sheets. Specifically, the number of rotations of the photosensitive drum 1 is controlled to be greater as the number of fed sheets increases. Further, it is understood that the extension time of the pre-rotation process reaches the longest time at the suspension time of 30 seconds after the previous job and decreases thereafter. Reasons therefor will be described below.

Each suspension time in FIG. 6 indicates a case where the suspension time is a maximum value, and each number of fed sheets in FIG. 6 indicates a case where the number of fed sheets is a maximum value. Specifically, the suspension time of 5 seconds indicates that the suspension time is 0 seconds to 5 seconds, and the suspension time of seconds indicates that the suspension time is longer than 5 seconds and not longer than seconds. Further, rotation time values between suspension times and between the numbers of fed sheets can be linearly interpolated. Further, while not illustrated, the same fixing temperature control as the image forming process is applied to the fixing device 9 during the pre-rotation process. The temperature is controlled to 180° C. during the pre-rotation and the image forming process according to the present exemplary embodiment. The fixing temperature control during the pre-rotation process can be changed as appropriate in accordance with the fixing temperature control during the image forming.

FIG. 7 illustrates toner smear occurrence results in a case where sheets with a high water content were fed according to the first exemplary embodiment and toner smear occurrence results in a case where sheets with a high water content were fed and the pre-rotation process was not extended (comparative example). In FIG. 7, the symbol "o" means "None" indicating no occurrence of an adverse effect of toner adhesion to the surface of the photosensitive drum 1 on an image, the symbol "Δ" means "Slight" indicating an occurrence of slight toner adhesion to the surface of the photosensitive drum 1 but no adverse effect on an image, and the symbol "x" means "Significant" indicating an occurrence of a significant adverse effect on an image. In the sheet feeding experiments, letter-size Xerox Vitality Multipurpose sheets with a grammage of 75 g/m 2 were used as recording mediums, and the sheets had been unwrapped and left for two days under an environment at an ambient temperature of 30° C. and a humidity of 80% before use. The water content of the sheets was measured with a moisture analyzer Moistrex MX-8000 manufactured by NDC Infrared Engineering, and the result was 9.2%. Further, the water content immediately after the unwrapping was measured for comparison, and the result was 5.7%. As illustrated in FIG. 7, the greater the number of fed sheets in the previous job, the worse the toner smear level in the comparative example. Further, the toner smear level is at the lowest level at the suspension time of 30 seconds and improves thereafter. This is due to the following reason. Specifically, as the suspension time increases, water droplets form an aggregate, but after a predetermined time passes, which is 30 seconds or longer according to the present exemplary embodiment, the water droplets start evaporating. Therefore, an effect of the water droplets decreases as the elapsed time increases. Thus, a time period of the worst toner smear level is about 30 seconds after the sheet feeding. Further, the toner smear level remains unchanged in the cases where the number of fed sheets is 100 or more because while moisture is generated as a result of sheet feeding, the moisture evaporates due to the atmospheric temperature in the image forming apparatus 100. On the contrary, in the first exemplary embodiment, while slight toner smears occur in the cases where the number of fed sheets in the previous job is 50 or more and the suspension time is about 30 seconds, no toner smears occur in the other cases. This is due to the extension time of the pre-rotation process that is set based on the number of fed sheets in the previous job and the suspension time.

6. Effect of the Present Exemplary Embodiment

As described above, according to the present exemplary embodiment, the pre-rotation process is extended for a necessary time based on the number of fed sheets in the previous job and the suspension time after the previous job. This facilitates evaporation of water droplets on the surface of the photosensitive drum 1 and provides stable images without image defects such as toner smears.

While the application to the image forming apparatus 100 that uses the direct current (DC) charging method is described as an example in the present exemplary embodiment, it is also possible to apply the present disclosure to an image forming apparatus that uses an alternating current (AC) charging method in which an oscillation voltage with direct-current voltage (direct current component) and alternating current voltage (alternating current component) superimposed is used as the charging voltage.

Further, while only the direct current component of the development voltage is described in the present exemplary embodiment, the development voltage can be an oscillation voltage in which direct-current voltage (direct current component) and alternating current voltage (alternating current component) are superimposed.

Further, while the toner that is a non-magnetic single-component developer agent is used as a developer agent in the present exemplary embodiment, a magnetic single-component developer agent can be also used.

Further, while the "cleaner-less method" without a unit for cleaning the photosensitive drum 1 is used according to the present exemplary embodiment, the method is not limited thereto. For example, a "blade cleaning method" using a blade as a cleaning unit disposed downstream of the brush member 10 and upstream of the charging roller 2 in a conveyance direction of the photosensitive drum 1 can be used.

Further, while the extension time is changed based on the number of fed sheets in the previous job according to the present exemplary embodiment, the configuration is not limited thereto. For example, the extension time can be changed based on a time or distance of passage of the recording materials P on the photosensitive drum 1.

As a result of those described above, a configuration described below is employed according to the present exemplary embodiment.

The image forming apparatus 100 according to present exemplary embodiment includes the photosensitive drum 1 configured to rotate and the charging roller 2 configured to charge the surface of the photosensitive drum 1 at the charging portion a. The image forming apparatus 100 includes the development roller 31 configured to supply the toner to the surface of the photosensitive drum 1 charged by the charging roller 2 and to form a toner image. The image forming apparatus 100 includes the transfer roller 5 configured to be in contact with the photosensitive drum 1 to form the transfer portion d and transfer the toner image formed on the photosensitive drum 1 to the recording material P at the transfer portion d. The image forming apparatus 100 includes the brush member 10 configured to be in contact with the surface of the photosensitive drum 1 downstream of the transfer portion d and upstream of the charging portion a in the rotation direction of the photosensitive drum 1 and the driving motor 110 configured to rotate the photosensitive drum 1. The image forming apparatus 100 includes the memory 152 configured to store the usage history information about photosensitive drum 1 and the control unit 150 configured to control the driving motor 110. The image forming apparatus 100 includes the measurement unit 153 configured to measure the suspension time between the first image forming operation of forming an image on a recording material P and the second image forming operation performed after the first image forming operation.

After a lapse of the suspension time between the first image forming operation of forming an image on a recording material P and the second image forming operation performed after the first image forming operation, the rotation operation of rotating the photosensitive drum 1 is controlled to be performed before the second image forming operation is performed. The number of rotations of the photosensitive drum 1 in the rotation operation performed before the second image forming operation is controlled based on the usage history information about the photosensitive drum 1 and the suspension time. Targets of the control are not limited to the number of rotations of the photosensitive drum 1 and can be the rotation time of the photosensitive drum 1.

Further, the number of rotations of the photosensitive drum 1 in the rotation operation is controlled to be less in a case where the number of recording materials P conveyed through the transfer portion d in the first image forming operation is a first value than in a case where the number of recording materials P is a second value greater than the first value.

Further, the suspension time is the time from when the photosensitive drum 1 is changed from a driving state where the photosensitive drum 1 is rotated to a suspension state where the rotation of the photosensitive drum 1 is suspended after the first image forming operation to when the photosensitive drum 1 is changed from the suspension state to the driving state to start the second image forming operation. The suspension time according to the present exemplary embodiment is not limited to those described above and can be a time that correlates with the phenomenon of accumulation of water droplets on the brush member 10. For example, the suspension time can be the time from a point of time immediately after the first image forming operation ends to a point of time immediately before the second image forming operation starts. The suspension time can be any period as long as the suspension time includes the time during which the photosensitive drum 1 is suspended.

Further, the suspension time can be not only measured by the measurement unit 153 but also predicted from an attenuation condition of the surface potential of the photosensitive drum 1, a transition of temperature of the image forming apparatus 100, and a change in temperature of the fixing device 9.

Further, while the extension time of the pre-rotation process is stored in a table in the memory 152 as illustrated in FIG. 6 according to the present exemplary embodiment, the table can store not extension time values but a total time of the extension time and the pre-rotation process or an extension ratio with respect to the pre-rotation process time. Further, coefficients corresponding to the number of printed recording materials P and the suspension time can be stored and an extension time can be calculated each time without preparing a table.

Next, another exemplary embodiment will be described below. A basic configuration and operation of an image forming apparatus according to the present exemplary embodiment are similar to those of the image forming apparatus 100 according to the first exemplary embodiment. Thus, components of the image forming apparatus according to the present exemplary embodiment that have similar or corresponding functions or configurations to those of the components of the image forming apparatus 100 according to the first exemplary embodiment are given the same reference numerals as those of the components of the image forming apparatus 100 according to the first exemplary embodiment, and redundant detailed descriptions thereof are omitted.

1. Feature of the Second Exemplary Embodiment

A feature of the second exemplary embodiment is that the extension time of the pre-rotation process is variable based on a usage environment of the image forming apparatus 100. The image forming apparatus 100 for use in the second exemplary embodiment includes an environment sensor 300, and the extension time of the pre-rotation process described in the first exemplary embodiment is determined based on environment information that is a result of detection by the environment sensor 300. The environment information includes absolute water content information about the environment that is calculated by the CPU 151 based on results of detection of a temperature sensor and a humidity sensor (both not illustrated) of the environment sensor 300. According to the second exemplary embodiment, an absolute water content obtained from the environment sensor 300 is stored in units of 0.1 g/m$^3$ in the memory 152 in the control unit 150. Then, in a case where the image forming apparatus 100 receives an image output operation (job) signal, the control unit 150 determines whether the absolute water content is higher or lower than a threshold value of 10.5 g/m$^3$. In a case where the absolute water content is higher than the threshold value of 10.5 g/m$^3$, the same operation of extending the pre-rotation process as in the first exemplary embodiment is performed. The extension time of the pre-rotation process is similar to that described above with reference to FIG. 6 according to the first exemplary embodiment, so that redundant description thereof is omitted. On the other hand, in a case where the absolute water content is lower than the threshold value of 10.5 g/m$^3$, the operation of extending the pre-rotation process is not performed. This prevents unnecessary rotation of the photosensitive drum 1 in an environment other than an environment with a high absolute water content. The absolute water content for determining whether to change the extension time of the pre-rotation process based on the usage environment is not limited to the above-described value and can be changed as appropriate.

2. Function Effect of the Second Exemplary Embodiment

As described above, according to the second exemplary embodiment, control is performed as described below based on the absolute water content obtained from a result of detection by the environment sensor 300. Only in a case where the absolute water content is higher than 10.5 g/m$^3$, the pre-rotation process is extended by a necessary time based on the number of fed sheets in the previous job and the suspension time after the previous job. This prevents unnecessary rotation of the photosensitive drum 1 in an environment other than an environment with a high absolute water content, and an operation for effective evaporation of water droplets on the surface of the photosensitive drum 1 is performed as needed.

As a result of those described above, a configuration described below is employed according to the second exemplary embodiment.

The image forming apparatus 100 includes the environment sensor 300 configured to detect an installation environment of the image forming apparatus 100, and the number of rotations is controlled based on the installation environment. As used herein, the term "installation environment" refers to the temperature or humidity detected by the environment sensor 300 and the absolute water content. The absolute water content can be calculated from temperature and humidity detection results. Further, the absolute water content can be calculated by predicting the temperature or humidity.

According to the second exemplary embodiment, the usage environment of the image forming apparatus 100 is divided into two environments that are an environment with a high absolute water content and an environment other than the environment with a high absolute water content, based on the absolute water content obtained from a result of detection by the environment sensor 300, to determine whether to extend the pre-rotation process. However, the configuration is not limited thereto. For example, the usage environment of the image forming apparatus 100 can be divided into a plurality of environments, e.g., three environments, based on the absolute water content, and the extension time of the pre-rotation process can be changed as appropriate for the environment. Specifically, a plurality of threshold values can be set. Further, the extension time of the pre-rotation process can be changed as appropriate based on the absolute water content. In other words, the number of rotations of the photosensitive drum 1 can be controlled to be greater in a case where the absolute water content is detected as a first absolute water content than in a case where a second absolute water content lower than the first absolute water content is detected.

Further, while the environment sensor 300 is used as a unit for detecting the usage environment of the image forming apparatus 100 according to the second exemplary embodiment, this is not a limiting configuration. For example, the usage environment can be determined based on detection of an electric resistance value of the transfer roller 5 (transfer auto transfer voltage control (transfer ATVC) result).

1. Brush Voltage Control

A feature of the present exemplary embodiment is that the brush power source E4 in FIG. 3 applies a brush voltage to the brush member 10 during the pre-rotation process. Brush voltage control in the pre-rotation process will be described below.

The control unit 150 applies a predetermined brush voltage to the brush member 10 according to the present exemplary embodiment. The predetermined brush voltage is a direct-current voltage of negative polarity. The brush voltage application unit E4 can apply, for example, a voltage on which a direct current component and an alternating current component are superimposed. The brush voltage during the image forming process is −300 V according to the present exemplary embodiment. Meanwhile, the surface potential of the photosensitive drum 1 after the transfer portion d is passed is about −50 V. Thus, untransferred residual toner that is conveyed from the transfer portion d and is charged to positive polarity is primarily collected by the brush member 10 due to a potential difference between the brush voltage and the surface potential of the photosensitive drum 1 at a brush portion e. On the other hand, the toner charged to negative polarity is attracted toward the photosensitive drum 1 at the brush portion e and passes through the brush portion e. The toner having passed through the brush portion e has desired negative polarity charges as a result of the uniform discharge at the charging portion a and is conveyed to the development portion c. Of the toner that is conveyed to the development portion c, toner in a non-image region (non-exposure region) is moved to the development roller 31 due to a potential difference between the dark-area potential (Vd) of the surface of the photosensitive drum 1 and the development bias (Vdc) and is collected by the development device 3. According to the present exemplary embodiment, the dark-area potential (Vd) is about −600 V and the development bias (Vdc) is −300 V as in the first exemplary embodiment. On the other hand, toner in an image region (exposure region) is not moved to the development roller 31 due to a potential difference between the light-area potential (Vl) of the surface of the photosensitive drum 1 and the development bias (Vdc) and is conveyed as an image portion to the transfer portion d along with the rotation of the photosensitive drum 1 and is transferred to the recording material P. The light-area potential (Vl) according to the present exemplary embodiment is about −100 V as in the first exemplary embodiment.

2. Pre-rotation Process Extension Operation

Figure 8:
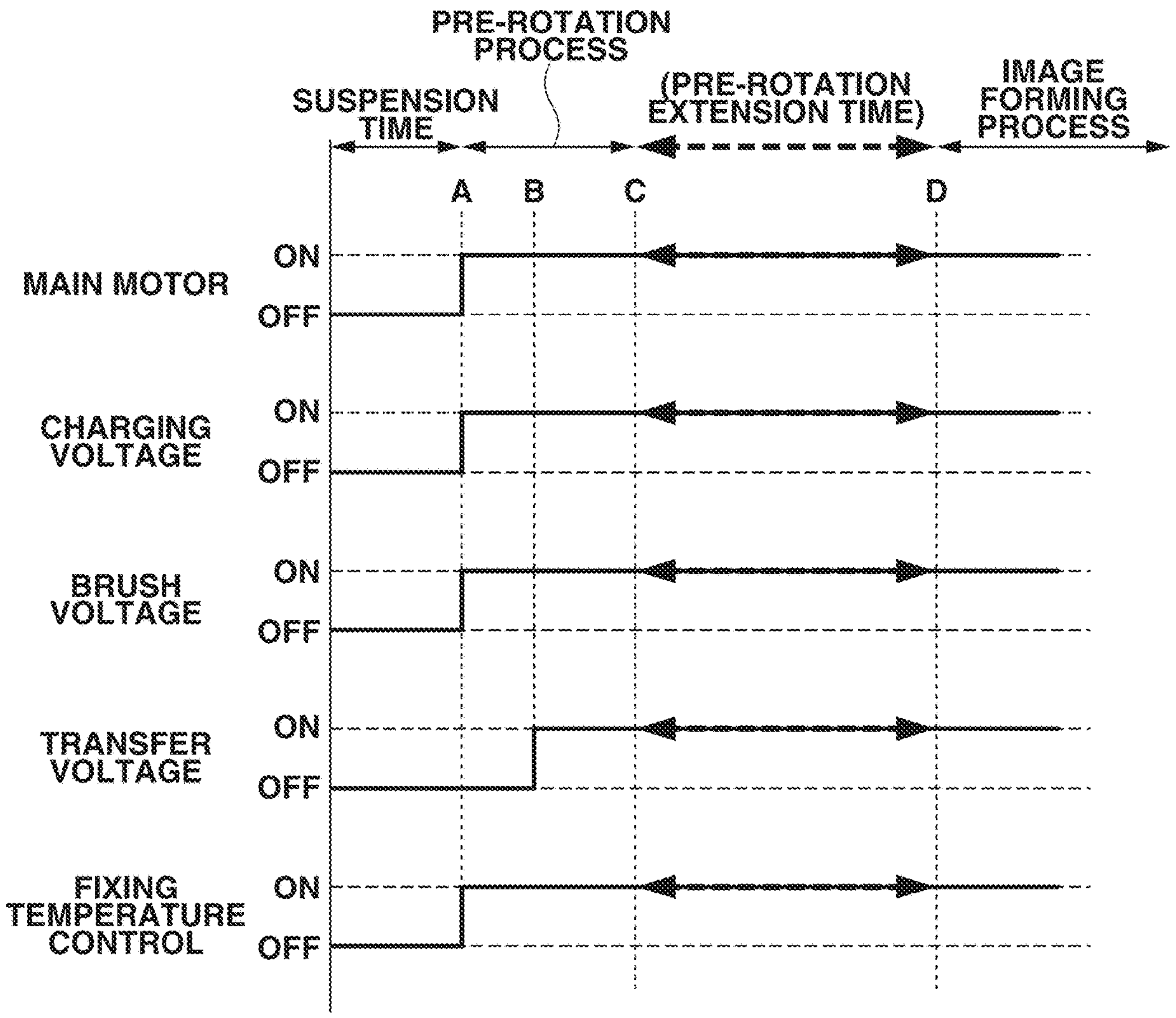
FIG. 8 is a diagram illustrating a timing chart of the pre-rotation process according to the first exemplary embodiment.

FIG. 8 is a timing chart illustrating the pre-rotation process according to the present exemplary embodiment. In FIG. 8, timing A is a timing when the image forming apparatus 100 receives an image output operation (job) signal from an external device and starts the pre-rotation process. At this time, the control unit 150 determines the extension time of the pre-rotation process based on the number of fed sheets in the previous job and the suspension time after the previous job. Then, at the timing A, driving of the driving motor 110 is started, and the output of the charging voltage and the output of the brush voltage are turned on. Further, the fixing device 9 starts output so that the fixing temperature is controlled to be the same as the image forming process (180° C.). The timings to turn on the charging voltage and the brush voltage can each be earlier or later depending on a power source rise time. Further, the timing to output the fixing temperature control can be earlier or later depending on the responsiveness of the fixing device 9.

The output value of the charging voltage is −1200 V as in the image forming process, so that the surface potential of the photosensitive drum 1 is uniformly equal to the dark-area potential (−600 V). While the surface potential of the photosensitive drum 1 maintains the value of the dark-area potential (−600 V), the surface of the photosensitive drum 1 passes through the development portion c and arrives at the transfer portion d. At this time, the transfer voltage is not applied to the transfer roller 5, so that the surface of the photosensitive drum 1 arrives at the brush portion e while the dark-area potential (−600 V) is still maintained. The output value of the brush voltage is −300 V as in the image forming process. Consequently, the positive-polarity toner remaining on the brush member 10 is expelled to the surface of the photosensitive drum 1 due to the potential difference between the brush voltage and the dark-area potential (−600 V) of the photosensitive drum 1.

Figure 9:
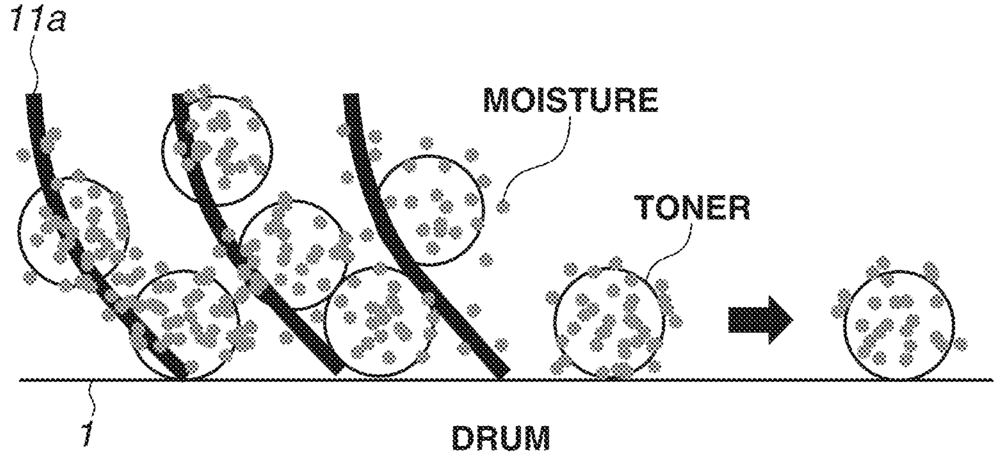
FIG. 9 is a view illustrating toner and moisture on the brush member according to the first exemplary embodiment.

Although the cleaning operation of expelling the untransferred residual toner that is primarily collected by the brush member 10 during the image forming process is performed in the post-rotation process according to the present exemplary embodiment, some toner remains on the brush member 10 even thereafter. Thus, at timing A and thereafter, the residual toner on the brush member 10 that has positive polarity is actively expelled. At this time, moisture is present around the toner, and the toner is expelled together with the moisture from the brush member 10. FIG. 9 illustrates a state of the toner and the moisture in the brush member 10 at this time. From FIG. 9 it is understood that moisture is attached to the toner on the brush member 10 and is expelled together with the toner expelled from the brush member 10. As described above, expelling the residual toner on the brush member 10 promotes the expelling of the moisture attached to the brush member 10.

According to the present exemplary embodiment, while the transfer voltage is not applied at timing A, the brush voltage (−300 V) is to be set to a value that does not decrease the surface potential of the photosensitive drum 1, i.e., a voltage value that has the same negative polarity as the surface potential of the photosensitive drum 1 and has a small absolute value.

Next, at timing B in FIG. 8, the output of the transfer voltage is turned on. The output value of the transfer voltage at this time is +1000 V. Thus, the surface potential of the photosensitive drum 1 after the transfer portion d is passed is about −50 V. Meanwhile, the output value of the brush voltage still maintains −300 V, so that at this time the negative polarity toner remaining on the brush member 10 is expelled to the surface of the photosensitive drum 1 due to the potential difference between the brush voltage and the surface potential of the photosensitive drum 1 (−50 V). Then, similarly, expelling of the moisture attached to the brush member 10 is promoted. Timing B is set to secure a time to expel the positive polarity toner in the brush member 10, and according to the present exemplary embodiment, timing B is set 500 ms after timing A.

As described above, the brush voltage is applied and the positive- and negative-polarity residual toners in the brush member 10 are expelled due to the potential difference from the surface potential of the photosensitive drum 1 to promote expelling of the moisture.

Timing C in FIG. 8 is a timing at which the image forming process starts in a case where the pre-rotation process is not extended. In a case where it is determined that the pre-rotation process is to be extended at timing A, the extension operation is started from timing C, and the image forming process is started from timing D. Specifically, from timing C to timing D in FIG. 8 is the extension time of the pre-rotation process.

FIG. 10 illustrates extension times of the pre-rotation process according to the present exemplary embodiment. From FIG. 10 it is understood that the extension time of the pre-rotation process is shorter than the extension time of the pre-rotation process according to the first exemplary embodiment (FIG. 6). This is because the moisture is actively expelled together with the residual toner in the brush member 10 by the brush voltage according to the third exemplary embodiment to promote evaporation of water droplets in the pre-rotation process. 3. Effect of the Present Exemplary Embodiment As described above, according to the present exemplary embodiment, while the residual toner in the brush member 10 is expelled by the brush voltage concurrently with the start of the pre-rotation process, the pre-rotation process is extended by a necessary time based on the number of fed sheets in the previous job and the suspension time from the previous job. Since the moisture is expelled together with the residual toner in the brush member 10, water droplets on the surface of the photosensitive drum 1 evaporate effectively and the extension time of the pre-rotation process is decreased.

Thus, stable images with reduced image defects such as toner smears are provided while the lifetime of the image forming apparatus 100 is increased.

As a result of those described above, a configuration described below is employed according to the third exemplary embodiment.

The image forming apparatus 100 includes the brush power source (brush voltage application unit) E4 configured to apply the brush voltage to the brush member 10. The brush member 10 is a conductive brush, and the brush voltage application unit E4 is controlled so that the brush voltage having the same polarity as the toner charged to the normal polarity is applied to the brush member 10 while the rotation operation is performed.

The brush voltage application unit E4 is controlled so that while the rotation operation is performed, the potential difference between the brush voltage applied to the brush member 10 and the surface potential of the photosensitive drum 1 increases gradually at the brush portion e where the surface of the photosensitive drum 1 and the brush member 10 are in contact with each other.

The brush voltage application unit E4 is controlled so that the brush voltage applied to the brush member 10 and the surface potential of the photosensitive drum 1 have the same polarity and the absolute value of the brush voltage is greater than the absolute value of the surface potential of the photosensitive drum 1. Alternatively, the brush voltage application unit E4 is controlled so that the brush voltage applied to the brush member 10 and the surface potential of the photosensitive drum 1 have the same polarity and the absolute value of the brush voltage is less than the absolute value of the surface potential of the photosensitive drum 1.

Further, the image forming apparatus 100 includes the transfer power source (transfer voltage application unit) E3 configured to apply the transfer voltage to the transfer roller 5. The transfer voltage application unit E3 is controlled so that the brush voltage applied to the brush member 10 and the surface potential of the photosensitive drum 1 at the transfer portion d have the same polarity and the surface potential of the photosensitive drum 1 at the transfer portion d is lower than the brush voltage applied to the brush member 10.

While the surface potential of the photosensitive drum 1 is controlled by changing the transfer voltage and the brush voltage according to the present exemplary embodiment, this is not a limiting configuration. For example, the transfer voltage and the brush voltage can be changed with the photosensitive drum 1 grounded to set the surface potential to the ground (0 V). Further, potential relationships with the transfer roller 5 and the brush member 10 can be controlled by applying a voltage directly to the photosensitive drum 1.

While the application to the image forming apparatus 100 that uses the direct current (DC) charging method is described as an example in the present exemplary embodiment, it is also possible to apply the present disclosure to an image forming apparatus that uses an AC charging method in which an oscillation voltage with direct-current voltage (direct current component) and alternating current voltage (alternating current component) superimposed is used as the charging voltage.

Further, while only the direct current component of the development voltage is described according to the present exemplary embodiment, the development voltage can be an oscillation voltage in which direct-current voltage (direct current component) and alternating current voltage (alternating current component) are superimposed.

Further, while the toner that is a magnetic single-component developer agent is used as a developer agent according to the present exemplary embodiment, a non-magnetic single-component developer agent can also be used.

Further, while the "cleaner-less method" without a unit for cleaning the photosensitive drum 1 is used according to the present exemplary embodiment, this is not a limiting method. For example, a "blade cleaning method" using a blade as a cleaning unit disposed downstream of the brush member 10 and upstream of the charging roller 2 in a conveyance direction of the photosensitive drum 1 can be used.

Further, while the extension time is changed based on the number of fed sheets in the previous job according to the present exemplary embodiment, this is not a limiting configuration. For example, the extension time can be changed based on a time or distance of passage of sheets by the photosensitive drum 1.

Further, while the recording material P that is a transfer material to which a toner image is to be transferred to is conveyed to the transfer portion d and undergoes the transfer according to the present exemplary embodiment, a conveyor belt for conveying the recording materials P to the transfer portion d can be provided.

Further, according to the present exemplary embodiment, a pre-exposure unit for exposing the surface of the photosensitive drum 1 at a position downstream of the transfer portion d and upstream of the charging portion a in the rotation direction of the photosensitive drum 1 can be provided. The pre-exposure unit can be disposed either upstream or downstream of the brush portion (contact portion) e where the brush member and the photosensitive drum 1 are in contact with each other. In a case where the pre-exposure unit is disposed upstream of the contact portion e, the surface potential of the photosensitive drum 1 can be controlled by the pre-exposure unit.

Next, a fourth exemplary embodiment will be described below. As illustrated in FIG. 1, the image forming apparatus 100 according to the present exemplary embodiment includes a paper dust trapping mechanism and the brush member 10 (collection member) that is a contact member as a moisture collection mechanism. In the image forming apparatus 100 according to the present exemplary embodiment, the brush member is disposed to be in contact with the surface of the photosensitive drum 1 at position downstream of the transfer portion d and upstream of the charging portion a in the rotation direction of the photosensitive drum 1. In the present exemplary embodiment, the brush contact portion refers to the contact portion of the brush member 10 and the photosensitive drum 1 in the rotation direction of the photosensitive drum 1.

Figure 12:
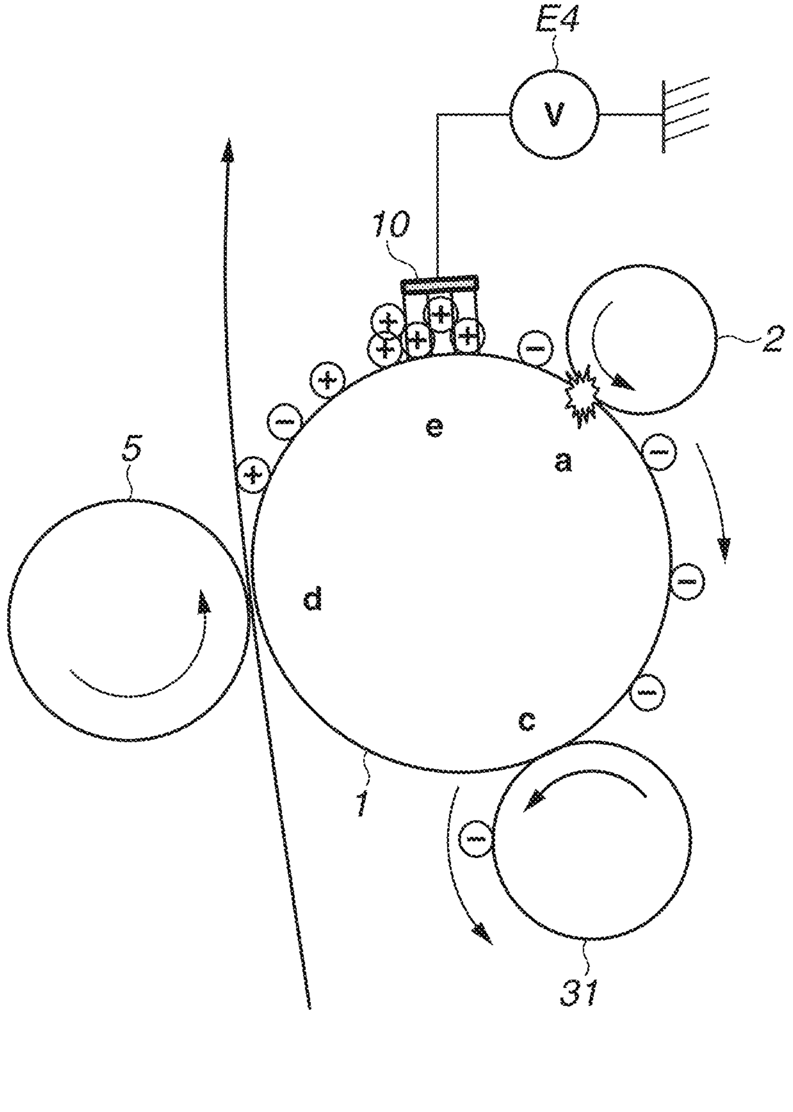
FIG. 12 is a view illustrating a state of a portion around a photosensitive drum during an image forming process according to a fifth exemplary embodiment.

FIGS. 1 and 12 illustrate a layout in a state where the image forming apparatus 100 is placed on an even installation surface as a normally expected installation state. A left-right direction of the drawing sheets corresponds to a horizontal direction of the image forming apparatus 100, and an up-down direction of the drawing sheets corresponds to an up-down direction of the image forming apparatus 100 (gravity direction, vertical direction).

Water Absorption Amount of the Brush and Image Evaluation Comparison

Next, a water absorption amount of the brush member 10 and image evaluation according to the present exemplary embodiment will be described in detail below together with a comparative example. The water absorption amount of the brush member 10 according to the present exemplary embodiment was measured by a method described below. Measurement methods are not limited to those described herein.

Measurement of Water Absorption Amount

The fixed brush 11 including the plurality of conductive yarns 11*a* made of various materials and fibers of different densities and woven in the base cloth 11*b* as illustrated in FIG. 2 was used. The shape and dimensions of the fixed brush 11 were similarly L1=6.5 mm, L3=5 mm, and the length in the lengthwise direction=216 mm.

Figure 11A:
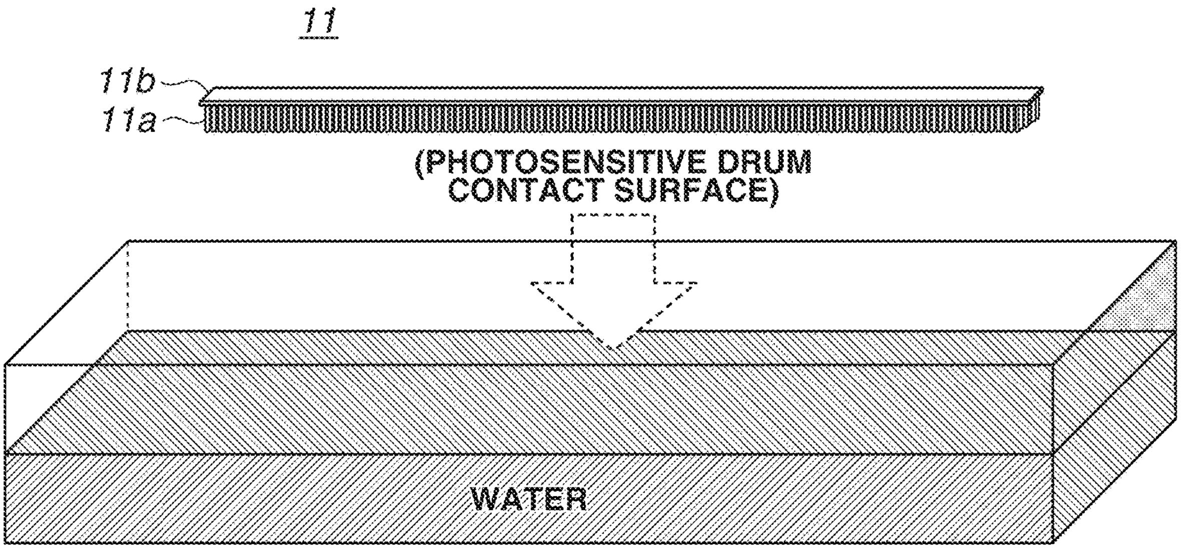
FIGS. 11A and 11B are views illustrating a process of measuring a water absorption amount of a brush member according to a fourth exemplary embodiment.
Figure 11B:
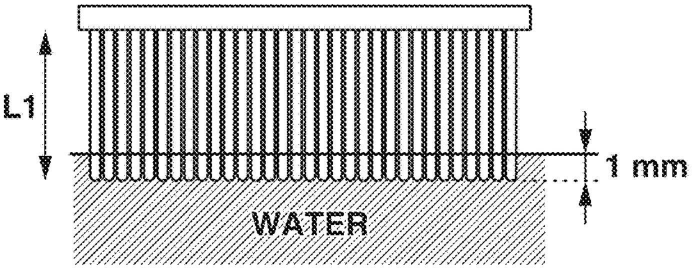

FIG. 11 illustrates a measurement of the water absorption amount of the brush member 10 according to the present exemplary embodiment. After an initial weight (W0) of the fixed brush 11 is measured, a contact surface of the fixed brush 11 that is to be brought into contact with the photosensitive drum 1 is moved toward a 20° C. water surface such that the contact surface is parallel to the water surface (FIG. 11A), and only a 1-mm tail edge of the fixed brush 11 is immersed into the water for 10 seconds (FIG. 11B). The contact surface of the fixed brush 11 that is to be brought into contact with the photosensitive drum 1 is a term used to liken a gathering of the tail edges of the plurality of the conductive yarns 11*a* that are cut in substantially the same length, to a surface. The contact surface can be understood as a virtual surface including each tail edge of the plurality of fiber yarns 11*a*. Specifically, the fixed brush 11 (contact surface) is brought close to the water surface while keeping the contact surface parallel to the water surface, so that the tail edges of the plurality of fiber yarns 11*a* enter into the water at substantially the same timing and immersion levels of the plurality of fiber yarns 11*a* do not differ. Even if they differ, the difference is insignificant because only the 1-mm region from the tail edge of each fiber yarn 11*a* is reliably immersed into the water. Thereafter, the fixed brush 11 is lifted from the water surface, and the weight (W) of the sample is measured at timing when water droplets no longer drip from the sample. Then, the water absorption amount is calculated using the following formula.

$$\text{The water absorption amount (g)} = W - W0$$

Water Absorption Amount Comparison

Tests for comparing water absorption amounts were conducted using the conductive yarns 11*a* of below-described materials and densities as fiber materials of the conductive yarns 11*a*.

TABLE 1

| | A | B | C | D | E | F | G |
|---|---|---|---|---|---|---|---|
| Fiber Material | SFCP (manufactured by TOEISANGYO) | Beslon | MC Nylon A (manufactured by Mitsubishi Chemical Corporation) | MC Nylon B (manufactured by Mitsubishi Chemical Corporation) | 6 Nylon A | 6 Nylon B | 6 Nylon C (Present Exemplary Embodiment) |
| Water Absorption Rate | 0.1 | 0.3 | 0.5 | | | 1.1 | |

TABLE 1-continued

| | A | B | C | D | E | F | G |
|---|---|---|---|---|---|---|---|
| Density | 150 kF | 150 kF | 150 kF | 240 kF | 70 kF | 150 kF | 240 kF |
| Water Absorption Amount | 0.3 g | 0.8 g | 1.5 g | 2.4 g | 2.0 g | 2.4 g | 2.9 g |

From the items A, B, C, and F in Table 1 it is understood that MC nylon® and 6 nylon are greater in water absorption amount than SFCP and Beslon® from the point of view of fiber materials. This exhibits a trend corresponding to magnitudes of water absorption rates (rates of weight change in samples immersed for 24 hours in 23° C. water) measured according to an American Society for Testing and Materials (ASTM) D570 testing procedure, and the higher the water absorption rate of a fiber material, the greater the water absorption amount of the fiber material.

Further, from the items C, D, E, F, and G it is understood that, in a case of using the same fiber material, the higher the density of the conductive yarn 11*a* of, the greater the water absorption amount. This is because the conductive yarn 11*a* with a higher density has a larger surface area and the amount of attached moisture per unit area increases.

While the 6 nylon is used as a fiber material according to the present exemplary embodiment, the fiber material is not limited to the 6 nylon. Any fiber materials with high water absorption can be used, and the water absorption rate measured according to the ASTM D570 testing procedure is desirably 0.5% or higher, more desirably 1.1% or higher.

Image Evaluation Comparison

Next, a comparative image evaluation test in a case where a plurality of recording materials stored under a high-temperature high-humidity environment was fed was conducted. In the image evaluation, letter-size Xerox Vitality Multipurpose sheets with a grammage of 75 g/m$^2$, which had been unwrapped and left for two days under an environment at an ambient temperature of 30° C. and a humidity of 80%, were used. The water content of the sheets was measured with a moisture analyzer Moistrex MX-8000 manufactured by NDC Infrared Engineering, and the result was 9.2%. Further, the water content immediately after the unwrapping was measured for comparison, and the result was 5.7%.

Table 2 illustrates toner smear image occurrence results in consecutively feeding 100 sheets of each recording material. In Table 2, "None" indicates that no toner smear occurred on an image, "Slight" indicates that a slight toner smear image occurred on an image, and "Significant" indicates that a significant toner smear image occurred on an image.

From the items A, B, C, and F in Table 2 it is understood that a significant toner smear image occurred in consecutive fed 10 SFCP sheets and in consecutive fed 10 Beslon® sheets whereas toner smear images were greatly reduced with MCnylon® and 6 nylon each having a great water absorption amount.

Further, from the items C, D, and E, F, and G in Table 2 it is understood that toner smear images occurred at different timings for different densities. In the case of 6 nylon with a density of 70 kF, a slight toner smear image occurred on the 50$^{th}$ sheet. In the case of 6 nylon with a density of 150 kF, a slight toner smear image occurred on the 100$^{th}$ sheet. In the case of 6 nylon with a density of 240 kF, no toner smear images occurred even on the 100 t h sheet. This indicates that toner smear images are less likely to occur at higher densities. This is for the following reason. Specifically, the higher the density, the greater the water absorption amount, so that even in a case where recording materials with a high water content are fed, the brush member 10 can store the moisture therein.

In the present exemplary embodiment, in a case where recording materials with a high water content are expected, the measured water absorption amount of the fixed brush 11 is desirably 2.4 g or more, and the water absorption amount per unit area is desirably 2.2 mg/mm 2 or more. Thus, in a case where MC nylon® (water absorption rate=0.5%) is used, the density of the conductive yarn 11*a* is desirably 240 kF or higher, whereas in a case where 6 nylon (water

TABLE 2

| | A | B | C | D | E | F | G |
|---|---|---|---|---|---|---|---|
| Fiber Material | SFCP (manufactured by TOEISANGYO) | Beslon | MC Nylon A (manufactured by Mitsubishi Chemical Corporation) | MC Nylon B (manufactured by Mitsubishi Chemical Corporation) | 6 Nylon A | 6 Nylon B | 6 Nylon C (Present Exemplary Embodiment) |
| Water Absorption Rate | 0.1 | 0.3 | 0.5 | | | 1.1 | |
| Density | 150 kF | 150 kF | 150 kF | 240 kF | 70 kF | 150 kF | 240 kF |
| 1$^{st}$ sheet | None | None | None | None | None | None | None |
| 5$^{th}$ sheet | Slight | Slight | None | None | None | None | None |
| 10$^{th}$ sheet | Significant | Significant | None | None | None | None | None |
| 15$^{th}$ sheet | Significant | Significant | None | None | None | None | None |
| 20$^{th}$ sheet | Significant | Significant | None | None | None | None | None |
| 50$^{th}$ sheet | Significant | Significant | Slight | None | Slight | None | None |
| 100$^{th}$ sheet | Significant | Significant | Significant | Slight | Significant | Slight | None |

absorption rate=1.1%) is used, the density of the conductive yarn 11*a* is desirably 150 kF or higher.

The water absorption amount per unit area herein refers to a value obtained by dividing the measured water content of the fixed brush 11 by the contact area of the fixed brush 11 and the photosensitive drum 1. The abutment region of the fixed brush 11 and the photosensitive drum 1 is a gathering of abutment regions of the tail edges of the plurality of conductive yarns 11*a* and the photosensitive drum 1, and at a micro level there are space regions between adjacent tail edges of the conductive yarn 11*a* that are not in contact with the surface of the photosensitive drum 1. Thus, it is technically difficult to clearly define the abutment region of the fixed brush 11 and the photosensitive drum 1 as a single region. However, a single region can be defined by, for example, ignoring the space regions and determining an entire outline of the gathering of abutment regions of the plurality of conductive yarns 11*a* and the photosensitive drum 1 as an approximate abutment region, and the area of the region can be used as the contact area.

According to the present exemplary embodiment, the contact area is calculated as follows. Specifically, it is assumed that the region having the length corresponding to the amount of warpage (L1-L2) of 1 mm, which is a part of the length (L1) of 6.5 mm of the conductive yarn 11*a*, is abutted against the periphery of the photosensitive drum 1. Further, the length (L3) of 5 mm of the brush member 10 in the circumferential direction of the photosensitive drum 1 is assumed as the length (width) of the bundle of the conductive yarns 11*a* in the same direction. It is assumed that the conductive yarns 11*a* in contact with the periphery of the photosensitive drum 1 by the contact area of 1 mm form lines in a 5-mm range in the circumferential direction of the photosensitive drum 1 and the lines spread in the lengthwise direction of the periphery of the photosensitive drum 1 within the range of the width of 216 mm of the brush member 10 in the lengthwise direction. Therefore, the contact area is determined as 1 mm×5 mm×216 mm=1080 $mm^2$ according to the present exemplary embodiment. The water absorption amounts of the items A, B, C, D, E, F, and G per unit area according to the present exemplary embodiment are respectively 0.27 $mg/mm^2$, 0.74 $mg/mm^2$, 1.38 $mg/mm^2$, 2.22 $mg/mm^2$, 1.85 $mg/mm^2$, 2.22 $mg/mm^2$, and 2.68 $mg/mm^2$. The above-described method for defining the contact area is not the only method, and any other methods can be used. Effect in the Present Exemplary Embodiment As described above, according to the present exemplary embodiment, the brush member 10 with a water absorption amount of 2.2 $mg/mm^2$ per unit area is disposed downstream of the transfer portion d and upstream of the charging portion a in the rotation direction of the photosensitive drum 1. Thus, even in a case where recording materials with a high water content are consecutively fed, the brush member 10 can sufficiently collect moisture attached to the surface of the photosensitive drum 1. This prevents image defects such as toner smear images caused by moisture.

While the application to the image forming apparatus 100 that uses the direct current (DC) charging method is described as an example in the present exemplary embodiment, it is also possible to apply the present disclosure to an image forming apparatus that uses an AC charging method in which an oscillation voltage with direct-current voltage (direct current component) and alternating current voltage (alternating current component) superimposed is used as the charging voltage.

Further, while only the direct current component of the development voltage is described according to the present exemplary embodiment, the development voltage can be an oscillation voltage in which direct-current voltage (direct current component) and alternating current voltage (alternating current component) are superimposed.

Further, while the toner that is a non-magnetic single-component developer agent is used as a developer agent according to the present exemplary embodiment, a magnetic single-component developer agent can be used.

Further, while the "cleaner-less method" without a unit for cleaning the photosensitive drum 1 is used according to the present exemplary embodiment, this is not a limiting method. For example, a "blade cleaning method" using a blade as a cleaning unit disposed downstream of the brush member 10 and upstream of the charging roller 2 in a conveyance direction of the photosensitive drum 1 can be used.

Further, while the density of the conductive yarns 11*a* is determined considering a case where recording materials with a high water content are consecutively fed according to the present exemplary embodiment, this is not a limiting configuration. The time between sheets during consecutive sheet feeding can be set longer than the normal time based on the usage environment of image forming apparatus 100, e.g., a high humidity environment. In this case, toner smear images are prevented even if the water absorption amount of the brush member 10 is low, so that the density of the conductive yarns 11*a* can be set as appropriate depending on the time between sheets.

Next, a fifth exemplary embodiment will be described below. A basic configuration and operation of an image forming apparatus according to the present exemplary embodiment are similar to those of the image forming apparatus 100 according to the fourth exemplary embodiment. Thus, components of the image forming apparatus according to the present exemplary embodiment that have similar or corresponding functions or configurations to those of the components of the image forming apparatus 100 according to the fourth exemplary embodiment are given the same reference numerals as those of the component of the image forming apparatus 100 according to the fourth exemplary embodiment, and redundant detailed descriptions thereof are omitted.

A feature of the present exemplary embodiment is that the brush power source E4 illustrated in FIG. 3 applies the brush voltage to the brush member 10. Control of the brush voltage in the image forming process will be described below.

1. Brush Voltage Control

The control unit 150 controls the brush power source E4 to apply a predetermined brush voltage to the brush member 10 according to the present exemplary embodiment. The predetermined brush voltage is a direct-current voltage of negative polarity. The brush power source E4 serving as the brush voltage application unit can apply, for example, a voltage on which a direct current component and an alternating current component are superimposed. The brush voltage during the image forming process is −300 V according to the present exemplary embodiment. Meanwhile, the surface potential of the photosensitive drum 1 after the transfer portion d is passed is about −50 V. Thus, untransferred residual toner that is conveyed from the transfer portion d and is charged to positive polarity is primarily collected by the brush member 10 due to a potential difference between the brush voltage and the surface potential of the photosensitive drum 1 at the brush portion e. On the other hand, the toner charged to negative polarity is attracted toward the photosensitive drum 1 at the brush portion e and passes through the brush portion e. The toner having passed through the brush portion e has desired negative polarity charges as a result of the uniform discharge at the charging portion a and is conveyed to the development portion c. Of the toner that is conveyed to the development portion c, tone in a non-image region (non-exposure region) is moved to the development roller 31 due to a potential difference between the dark-area potential (Vd) of the surface of the photosensitive drum 1 and the development bias (Vdc) and is collected by the development device 3. According to the present exemplary embodiment, the dark-area potential (Vd) is about −600 V and the development bias (Vdc) is −300 V as in the fourth exemplary embodiment. On the other hand, toner in an image region (exposure region) is not moved to the development roller 31 due to a potential difference between the light-area potential (Vl) of the surface of the photosensitive drum 1 and the development bias (Vdc), is conveyed as an image portion to the transfer portion d along with the rotation of the photosensitive drum 1 and is transferred to the recording material P. The light-area potential (Vl) according to the present exemplary embodiment is about −100 V as in the fourth exemplary embodiment.

FIG. 12 illustrates a state of a portion around the photosensitive drum 1 during the image forming process. From FIG. 12 it is understood that the untransferred residual toner having positive polarity is primarily collected by the brush member 10 whereas the untransferred residual toner having negative polarity passes through the brush portion e and the charging portion a and is moved to the development roller 31.

Figure 13:
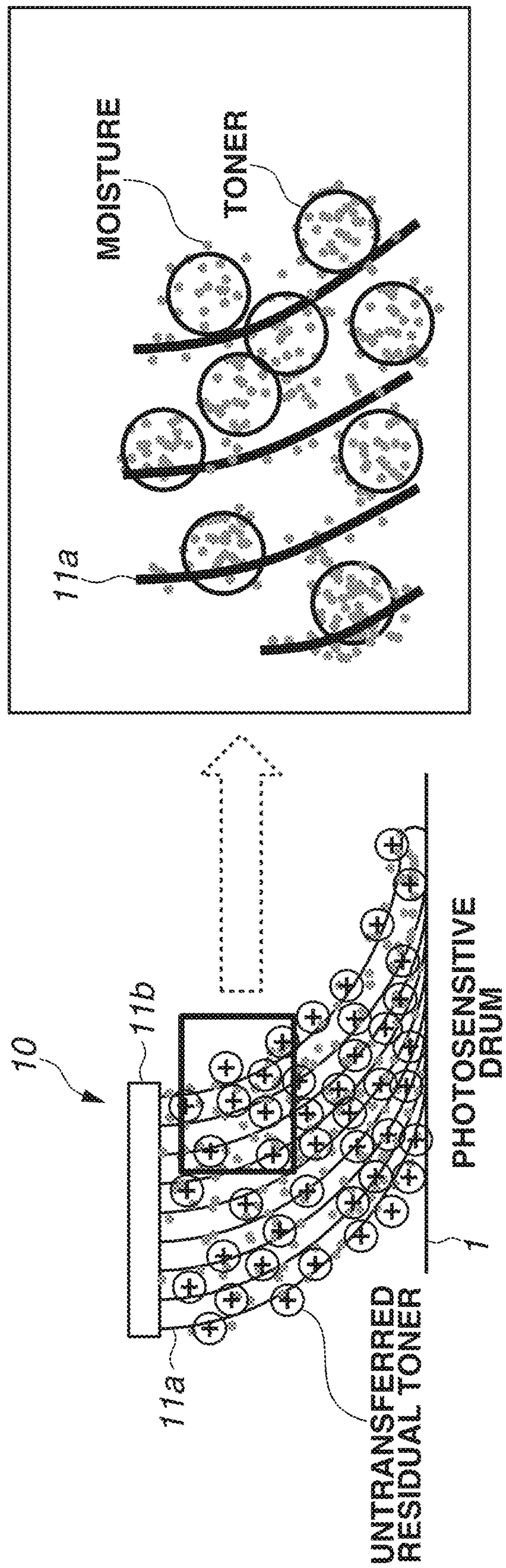
FIG. 13 is a view illustrating a state of toner collected primarily by a brush member according to the fifth exemplary embodiment.

FIG. 13 illustrates a state of the toner that is primarily collected by the brush member 10. From FIG. 13 it is understood that moisture is attached to the toner that is primarily collected by the brush member 10. As described above, the moisture attached to the surface of the photosensitive drum 1 is not only collected by the brush member 10 together with the untransferred residual toner but also conveyed toward the base cloth 11*b* (opposite the tail edge of the brush) of the brush member 10 together with the toner due to the brush voltage. Thus, the brush member 10 can collect a great amount of moisture as compared to a configuration without the application of the brush voltage.

2. Image Evaluation Comparison

Tests for comparing image evaluations in a case where a plurality of recording materials that had been stored under a high-temperature and high-humidity environment was fed were conducted as in the fourth exemplary embodiment. Detailed conditions are similar to those in the fourth exemplary embodiment, so that redundant descriptions thereof are omitted.

TABLE 3

<table>
<tr><th></th><th>A</th><th>B</th><th>C</th><th>D</th><th>E</th><th>F</th><th>G</th></tr>
<tr><td>Fiber Material</td><td>SFCP (manufactured by TOEISANGYO)</td><td>Beslon</td><td>MC Nylon A (manufactured by Mitsubishi Chemical Corporation)</td><td>MC Nylon B (manufactured by Mitsubishi Chemical Corporation)</td><td>6 Nylon A</td><td>6 Nylon B</td><td>6 Nylon C (Present Exemplary Embodiment)</td></tr>
<tr><td>Water Absorption Rate</td><td>0.1</td><td>0.3</td><td colspan="2">0.5</td><td colspan="3">1.1</td></tr>
<tr><td>Density</td><td>150 kF</td><td>150 kF</td><td>150 kF</td><td>240 kF</td><td>70 kF</td><td>150 kF</td><td>240 kF</td></tr>
<tr><td>$1^{st}$ sheet</td><td>None</td><td>None</td><td>None</td><td>None</td><td>None</td><td>None</td><td>None</td></tr>
<tr><td>$5^{th}$ sheet</td><td>None</td><td>None</td><td>None</td><td>None</td><td>None</td><td>None</td><td>None</td></tr>
<tr><td>$10^{th}$ sheet</td><td>Slight</td><td>Slight</td><td>None</td><td>None</td><td>None</td><td>None</td><td>None</td></tr>
<tr><td>$15^{th}$ sheet</td><td>Significant</td><td>Significant</td><td>None</td><td>None</td><td>None</td><td>None</td><td>None</td></tr>
<tr><td>$20^{th}$ sheet</td><td>Significant</td><td>Significant</td><td>None</td><td>None</td><td>None</td><td>None</td><td>None</td></tr>
<tr><td>$50^{th}$ sheet</td><td>Significant</td><td>Significant</td><td>None</td><td>None</td><td>None</td><td>None</td><td>None</td></tr>
<tr><td>$100^{th}$ sheet</td><td>Significant</td><td>Significant</td><td>Slight</td><td>None</td><td>Slight</td><td>None</td><td>None</td></tr>
<tr><td>$200^{th}$ sheet</td><td>Significant</td><td>Significant</td><td>Significant</td><td>Slight</td><td>Significant</td><td>Slight</td><td>None</td></tr>
</table>

Table 3 shows toner smear image occurrence results in consecutively feeding 200 sheets of each recording material. Image ranks in Table 3 are similar to those according to the fourth exemplary embodiment.

From Table 3 it is understood that toner smear image occurrence timings are delayed for all the fiber materials, i.e., toner smear images originating from an increase in the number of consecutively fed sheets are reduced. This is for the following reason. Specifically, since the brush voltage causes the moisture together with the toner to move toward the base cloth 11*b* (opposite the tail edge of the brush) of the brush member 10, a great amount of moisture is collected as compared to a case where the brush voltage is not applied.

3. Effect of the Present Exemplary Embodiment

As described above, according to the present exemplary embodiment, the brush voltage causes the moisture attached to the surface of the photosensitive drum 1 to move toward the base cloth 11*b* of the brush member 10 together with the untransferred residual toner. Thus, the brush member 10 can collect a great amount of moisture, and toner smear images originating from an increase in the number of consecutively fed sheets are reduced.

As a result of those described above, a configuration described below is employed according to the fifth exemplary embodiment.

The image forming apparatus 100 includes the brush power source E4 as the brush voltage application unit that applies the brush voltage to the brush member 10. The brush member 10 is a conductive brush, and the control unit 150 controls the brush voltage applied from the brush power source E4 to the brush member 10 so that the brush voltage having the same polarity as the toner charged to the normal polarity is applied to the brush member 10 while the image forming operation is performed.

The control unit 150 controls the voltage applied from the brush power source E4 to the brush member 10 so that the brush voltage applied to the brush member 10 and the surface potential of the photosensitive drum 1 have the same polarity and the absolute value of the brush voltage is greater than the absolute value of the surface potential of the photosensitive drum 1.

Further, the image forming apparatus 100 includes the transfer power source E3 as the transfer voltage application unit that applies the transfer voltage to the transfer roller 5. The control unit 150 controls the transfer power source E3 so that the brush voltage applied to the brush member 10 and the surface potential of the photosensitive drum 1 at the transfer portion d have the same polarity and the surface potential of the photosensitive drum 1 at the transfer portion d is lower than the brush voltage applied to the brush member 10.

While the surface potential of the photosensitive drum 1 is controlled by changing the transfer voltage or the brush voltage according to the present exemplary embodiment, this is not a limiting configuration. For example, the transfer voltage and the brush voltage can be changed with the photosensitive drum 1 grounded to set the surface potential to the ground (0 V). Further, potential relationships with the transfer roller 5 and the brush member 10 can be controlled by applying a voltage directly to the photosensitive drum 1.

While the application to the image forming apparatus 100 that uses the direct current (DC) charging method is described as an example in the present exemplary embodiment, it is also possible to apply the present disclosure to an image forming apparatus that uses an AC charging method in which an oscillation voltage with direct-current voltage (direct current component) and alternating current voltage (alternating current component) superimposed is used as the charging voltage.

Further, while only the direct current component of the development voltage is described according to the present exemplary embodiment, the development voltage can be an oscillation voltage in which direct-current voltage (direct current component) and alternating current voltage (alternating current component) are superimposed.

Further, while the toner that is a non-magnetic single-component developer agent is used as a developer agent according to the present exemplary embodiment, a magnetic single-component developer agent can be used.

Further, while the "cleaner-less method" without a unit for cleaning the photosensitive drum 1 is used according to the present exemplary embodiment, this is not a limiting method. For example, a "blade cleaning method" using a blade as a cleaning unit disposed downstream of the brush member 10 and upstream of the charging roller 2 in a conveyance direction of the photosensitive drum 1 can be used.

Further, while the recording material P that is a transfer material to which a toner image is transferred is conveyed to the transfer portion d and undergoes the transfer according to the present exemplary embodiment, a conveyor belt for conveying the recording materials P to the transfer portion d can be provided.

Further, according to the present exemplary embodiment, a pre-exposure unit for exposing the surface of the photosensitive drum 1 at a position downstream of the transfer portion d and upstream of the charging portion a in the rotation direction of the photosensitive drum 1 can be provided. The pre-exposure unit can be disposed either upstream or downstream of the contact portion e where the brush member 10 and the photosensitive drum 1 are in contact with each other. In a case where the pre-exposure unit is disposed upstream of the contact portion e, the surface potential of the photosensitive drum 1 can be controlled by the pre-exposure unit.

Further, while the density of the conductive yarns 11*a* is determined considering a case where recording materials with a high water content are consecutively fed according to the present exemplary embodiment, this is not a limiting configuration. The time between sheets during consecutive sheet feeding can be set longer than the normal time based on the usage environment of image forming apparatus 100, e.g., a high humidity environment. In this case, toner smear images are prevented even if the water absorption amount of the brush member 10 is low, so that the density of the conductive yarns 11*a* can be set as appropriate depending on the time between sheets.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

a rotary photosensitive drum;

a charging member configured to charge a surface of the photosensitive drum at a charging portion;

a development unit configured to supply toner onto the surface of the photosensitive drum charged by the charging member and to form a toner image on the photosensitive drum;

a transfer member configured to be in contact with the photosensitive drum to form a transfer portion and transfer the toner image formed on the photosensitive drum to a transfer material at the transfer portion;

a brush member provided with a plurality of fiber yarns contacting the surface of the photosensitive drum at a position downstream of the transfer portion and upstream of the charging portion in a rotation direction of the photosensitive drum;

a driving unit configured to rotate the photosensitive drum;

a storage unit configured to store information related to the use of the photosensitive drum; and a control unit configured to control the driving unit, wherein the control unit controls a first image forming operation of forming an image on the transfer material and a second image forming operation performed after the first image forming operation passes and a rotation operation of rotating the photosensitive drum so that the rotation operation is performed before the second image forming operation is performed, wherein the plurality of fiber yarns has a density of 150 kF or higher, and wherein the control unit controls a number of rotations of the photosensitive drum in the rotation operation based on the information.

2. The image forming apparatus according to claim 1, wherein a suspension time is a time from a change from a driving state where the photosensitive drum is rotated to a suspension state where the rotation of the photosensitive drum is suspended after the first image forming operation to a change of the photosensitive drum from the suspension state to the driving state to start the second image forming operation.

3. The image forming apparatus according to claim 2, further comprising a measurement unit configured to measure the suspension time between the first image forming operation of forming an image on the transfer material and the second image forming operation performed after the first image forming operation.

4. The image forming apparatus according to claim 2, wherein the control unit controls the number of rotations in the rotation operation performed before the second image forming operation, based on the information and the suspension time.

5. The image forming apparatus according to claim 1, further comprising an environment detection sensor configured to detect an installation environment of the image forming apparatus, wherein the control unit controls the number of rotations based on the installation environment.

6. The image forming apparatus according to claim 5, wherein the installation environment is a temperature or a humidity that is detected by the environment detection sensor.

7. The image forming apparatus according to claim 5, wherein the installation environment is an absolute water content that is detected by the environment detection sensor.

8. The image forming apparatus according to claim 7, wherein the control unit controls the number of rotations so that the number of rotations is greater in the rotation operation performed in a case where the absolute water content is detected as a first absolute water content than in the rotation operation performed in a case where a second absolute water content lower than the first absolute water content is detected.

9. The image forming apparatus according to claim 1, wherein the information is a number of transfer materials conveyed through the transfer portion in the first image forming operation.

10. The image forming apparatus according to claim 1, further comprising a brush voltage application unit configured to apply a brush voltage to the brush member, wherein the brush member is a conductive brush, and wherein the control unit controls the brush voltage application unit so that the brush voltage having a same polarity as the toner charged to a normal polarity is applied to the conductive brush during execution of the rotation operation.

11. The image forming apparatus according to claim 10, wherein the control unit controls the brush voltage application unit so that a potential difference between the brush voltage applied to the brush member and a surface potential of the photosensitive drum increases gradually during the execution of the rotation operation at a contact portion where the surface of the photosensitive drum and the brush member are in contact with each other.

12. The image forming apparatus according to claim 10, wherein the control unit controls the brush voltage application unit so that the brush voltage applied to the brush member and a surface potential of the photosensitive drum have a same polarity and an absolute value of the brush voltage is greater than an absolute value of the surface potential of the photosensitive drum.

13. The image forming apparatus according to claim 10, wherein the control unit controls the brush voltage application unit so that the brush voltage applied to the brush member and a surface potential of the photosensitive drum have a same polarity and an absolute value of the brush voltage is smaller than an absolute value of the surface potential of the photosensitive drum.

14. The image forming apparatus according to claim 10, further comprising a transfer voltage application unit configured to apply a transfer voltage to the transfer member, wherein the control unit controls the transfer voltage application unit so that the brush voltage applied to the brush member and a surface potential of the photosensitive drum at the transfer portion have a same polarity and the surface potential of the photosensitive drum at the transfer portion is lower than the brush voltage applied to the brush member.

15. The image forming apparatus according to claim 1, wherein the control unit controls the number of rotations of the photosensitive drum in the rotation operation so that the number of rotations is less in a case where a number of transfer materials conveyed through the transfer portion in the first image forming operation is a first value than in a case where the number of transferring materials is a second value greater than the first value.

16. The image forming apparatus according to claim 1, wherein the control unit controls a rotation time of the rotation operation to control the number of rotations of the photosensitive drum in the rotation operation.

17. The image forming apparatus according to claim 1, wherein the development unit collects the toner that is untransferred from the photosensitive drum to the transfer material and remains on the photosensitive drum at the transfer portion.

18. The image forming apparatus according to claim 1, wherein the toner is a single-component developer agent.

19. The image forming apparatus according to claim 1, wherein the plurality of fiber yarns has a density of 240 kF or higher.

20. The image forming apparatus according to claim 1, wherein the charging member is configured to be in contact with the photosensitive drum to form the charging portion.

* * * * *